(12) United States Patent
Mlynarczyk et al.

(10) Patent No.: US 11,176,765 B2
(45) Date of Patent: Nov. 16, 2021

(54) SYSTEM AND METHOD FOR COMBINED ELECTRONIC INVENTORY DATA AND ACCESS CONTROL

(71) Applicant: CompX International Inc., Greenville, SC (US)

(72) Inventors: Mitchell S. Mlynarczyk, Wauconda, IL (US); Kenneth A. Kaczmarz, LaGrange Park, IL (US); Jesse Mavromatis, Inverness, IL (US); Mike Jensen, Salem, WI (US); Arkady Grenader, Palatine, IL (US)

(73) Assignee: CompX International Inc., Greenville, SC (US)

( * ) Notice: Subject to any disclaimer, the term of this patent is extended or adjusted under 35 U.S.C. 154(b) by 0 days.

(21) Appl. No.: 16/106,619

(22) Filed: Aug. 21, 2018

(65) Prior Publication Data

US 2019/0057566 A1    Feb. 21, 2019

Related U.S. Application Data

(60) Provisional application No. 62/547,922, filed on Aug. 21, 2017.

(51) Int. Cl.
*G07C 9/00* (2020.01)
*G06K 19/07* (2006.01)
(Continued)

(52) U.S. Cl.
CPC ..... *G07C 9/00912* (2013.01); *G06K 17/0029* (2013.01); *G06K 19/0723* (2013.01);
(Continued)

(58) Field of Classification Search
CPC ............ G07C 9/00912; G07C 9/00007; G06K 17/0029; G06K 19/0723;
(Continued)

(56) References Cited

U.S. PATENT DOCUMENTS 3,504,511 A    4/1970 Allen
3,666,342 A    5/1972 Biesecker
(Continued)

OTHER PUBLICATIONS

IMPINJ, Inc.; Indy® RS500 Datasheet, IPJ-RS500-GX, IPJ-RS500-EU Electrical, Mechanical, & Thermal Specification; Revision 1.1; Copyright 2014 (25 pages).
(Continued)

*Primary Examiner* — Omar CasillasHernandez
(74) *Attorney, Agent, or Firm* — Dority & Manning, P.A.

(57) ABSTRACT

Disclosed are apparatuses and corresponding and associated methodologies for achieving current inventory data management in combination with an electronic access control system. An access control system provides access control data while the sealed enclosure incorporates an RFID reading system for determining the identity of respective tagged contents within the enclosure. Particularly in conjunction with the storage of controlled substances, such as some drugs utilized on an EMS vehicle, a form of RFID tag may be practiced which operationally is fully or partially destroyed or damaged, or otherwise impacted or affected so as to generate a changed ID, whenever the contained medicinal dosage is acquired for administration. By reading contents of the enclosure (narc box) prior to a work shift, and at the conclusion of the work shift, comprising tracking comparative methodology, usage of the tagged drugs may be tracked. By forming such reports throughout the course of a shift, as each point of consumption takes place, a complete record of custody of control may be maintained.

134 Claims, 12 Drawing Sheets

(51) Int. Cl.
  *G06Q 10/08* (2012.01)
  *G06K 17/00* (2006.01)
  *H04L 29/08* (2006.01)
  *G06K 19/077* (2006.01)
  *G07C 9/20* (2020.01)

(52) U.S. Cl.
  CPC ..... *G06K 19/07798* (2013.01); *G06Q 10/087* (2013.01); *G07C 9/00309* (2013.01); *G07C 9/20* (2020.01); *H04L 67/22* (2013.01)

(58) Field of Classification Search
  CPC ... G06K 2017/0045; G06K 2017/0048; G06Q 10/087; H04L 67/22
  See application file for complete search history.

(56) References Cited

U.S. PATENT DOCUMENTS

| | | |
|---|---|---|
| 3,792,391 A | 2/1974 | Ewing |
| 3,804,441 A | 4/1974 | Kobayashi et al. |
| 3,917,330 A | 11/1975 | Quantz |
| 4,017,107 A | 4/1977 | Hanchett |
| 4,026,589 A | 5/1977 | Hanchett, Jr. |
| 4,262,830 A | 4/1981 | Hayes |
| 4,268,076 A | 5/1981 | Itoi |
| 4,390,197 A | 6/1983 | Butts |
| 4,595,220 A | 6/1986 | Hanchett, Jr. et al. |
| 4,623,178 A | 11/1986 | Geringer et al. |
| 4,626,010 A | 12/1986 | Hanchett, Jr. et al. |
| 4,648,036 A | 3/1987 | Gallant |
| 4,667,990 A | 5/1987 | Quantz |
| 4,667,991 A | 5/1987 | Pèbre |
| 4,748,833 A | 6/1988 | Nagasawa |
| 4,901,545 A | 2/1990 | Bacon et al. |
| 4,956,984 A | 9/1990 | Chi-Cheng |
| 4,967,577 A | 11/1990 | Gartner et al. |
| 5,007,261 A | 4/1991 | Quantz |
| 5,020,345 A | 6/1991 | Gartner et al. |
| 5,033,282 A | 7/1991 | Gartner et al. |
| 5,134,870 A | 8/1992 | Uyeda et al. |
| 5,142,890 A | 9/1992 | Uyeda et al. |
| 5,217,088 A * | 6/1993 | Dallman ................ G07F 19/20 186/37 |
| 5,307,656 A | 5/1994 | Gartner et al. |
| 5,474,348 A | 12/1995 | Palmer et al. |
| 5,484,180 A | 1/1996 | Helmar |
| 5,520,450 A | 5/1996 | Colson, Jr. et al. |
| 5,540,068 A | 7/1996 | Gartner et al. |
| 5,617,082 A | 4/1997 | Denison et al. |
| 5,690,373 A | 11/1997 | Luker |
| 5,769,011 A | 6/1998 | Daniel |
| 5,806,355 A | 9/1998 | Lanigan et al. |
| 5,876,073 A | 3/1999 | Geringer et al. |
| 5,927,772 A | 7/1999 | Antonucci et al. |
| 5,934,720 A | 8/1999 | Karalius |
| 6,021,038 A | 2/2000 | Hanchett, Jr. |
| 6,089,058 A | 7/2000 | Elpern et al. |
| 6,089,626 A | 7/2000 | Shoemaker |
| 6,092,846 A | 7/2000 | Fuss et al. |
| 6,108,188 A | 8/2000 | Denison et al. |
| 6,112,502 A | 9/2000 | Frederick et al. |
| 6,116,067 A | 9/2000 | Myers et al. |
| 6,125,670 A | 10/2000 | Fuss et al. |
| 6,133,842 A | 10/2000 | Gariepy |
| 6,209,367 B1 | 4/2001 | Hyatt et al. |
| 6,359,547 B1 | 3/2002 | Denison et al. |
| 6,384,711 B1 | 5/2002 | Cregger et al. |
| 6,390,520 B1 | 5/2002 | Holzer |
| 6,655,180 B2 | 12/2003 | Gokcebay et al. |
| 6,708,538 B1 | 3/2004 | Walby |
| 6,730,867 B2 | 5/2004 | Hyp |
| 6,741,160 B1 | 5/2004 | Dawson et al. |
| 6,791,450 B2 | 9/2004 | Gokcebay et al. |
| 6,816,075 B2 | 11/2004 | Grunes et al. |
| 6,879,243 B1 | 4/2005 | Booth et al. |
| 6,886,869 B2 | 5/2005 | Martinez et al. |
| 6,950,944 B2 | 9/2005 | Yager et al. |
| 6,983,884 B2 | 1/2006 | Auchinleck |
| 7,004,517 B2 | 2/2006 | Vitry et al. |
| 7,021,684 B2 | 4/2006 | Orbeta et al. |
| D520,340 S | 5/2006 | Freck |
| 7,131,673 B2 | 11/2006 | Cherry et al. |
| 7,145,434 B2 | 12/2006 | Mlynarczyk et al. |
| 7,239,963 B2 | 7/2007 | Suzuki |
| 7,296,830 B2 | 11/2007 | Koveal et al. |
| 7,336,150 B2 | 2/2008 | Gokcebay et al. |
| 7,380,426 B2 | 6/2008 | Dalton, Jr. et al. |
| 7,455,335 B2 | 11/2008 | Garneau et al. |
| 7,456,725 B2 | 11/2008 | Denison et al. |
| 7,469,564 B1 | 12/2008 | Shaw |
| 7,472,934 B2 | 1/2009 | Burke et al. |
| 7,482,907 B2 | 1/2009 | Denison et al. |
| 7,516,632 B2 | 4/2009 | Poppell |
| 7,516,633 B1 | 4/2009 | Chang |
| 7,603,882 B2 | 10/2009 | Carbajal et al. |
| 7,683,758 B2 | 3/2010 | Denison et al. |
| 7,728,711 B2 | 6/2010 | Shoenfeld |
| 7,741,952 B2 | 6/2010 | Denison et al. |
| 7,768,378 B2 | 8/2010 | Hill et al. |
| 7,812,774 B2 | 10/2010 | Friman et al. |
| 7,830,320 B2 | 11/2010 | Shamblin et al. |
| 7,911,402 B2 | 3/2011 | Rowson et al. |
| 8,047,582 B1 | 11/2011 | Rodgers et al. |
| 8,104,803 B2 | 1/2012 | Horton et al. |
| 8,179,323 B2 | 5/2012 | Shamblin et al. |
| 8,199,019 B2 | 6/2012 | Kaczmarz et al. |
| 8,207,858 B2 | 6/2012 | Knopf et al. |
| 8,384,545 B2 | 2/2013 | Hussain et al. |
| 8,490,443 B2 | 7/2013 | Gokcebay |
| 8,495,898 B2 | 7/2013 | Gokcebay |
| 8,516,864 B2 | 8/2013 | Greiner et al. |
| 8,633,863 B2 | 1/2014 | Desclos et al. |
| 8,686,859 B2 | 4/2014 | Hussain et al. |
| 8,742,889 B2 | 6/2014 | Kaczmarz et al. |
| 8,928,140 B2 | 1/2015 | Nikitin |
| 8,970,344 B2 | 3/2015 | Payson et al. |
| 9,013,307 B2 | 4/2015 | Hussain et al. |
| 9,013,309 B2 | 4/2015 | Hussain et al. |
| 9,189,769 B2 | 11/2015 | Caputo et al. |
| 9,223,934 B2 | 12/2015 | Hussain et al. |
| 9,536,359 B1 | 1/2017 | Gokcebay |
| 2002/0014950 A1 | 2/2002 | Ayala et al. |
| 2002/0112174 A1 | 8/2002 | Yager et al. |
| 2003/0024288 A1 | 2/2003 | Gokcebay et al. |
| 2004/0032131 A1 | 2/2004 | Cherry |
| 2004/0084526 A1 | 5/2004 | Knowles et al. |
| 2005/0146419 A1 | 7/2005 | Porter |
| 2005/0166144 A1 * | 7/2005 | Gross ................... G06F 17/211 715/273 |
| 2005/0179517 A1 | 8/2005 | Harms et al. |
| 2005/0199026 A1 | 9/2005 | Geringer et al. |
| 2005/0225097 A1 | 10/2005 | Geringer et al. |
| 2006/0097522 A1 | 5/2006 | Denison et al. |
| 2006/0097525 A1 | 5/2006 | Toma et al. |
| 2006/0139148 A1 | 6/2006 | Faro et al. |
| 2006/0139149 A1 | 6/2006 | Faro et al. |
| 2006/0150694 A1 | 7/2006 | Frolov et al. |
| 2006/0186678 A1 | 8/2006 | Myers et al. |
| 2007/0018791 A1 | 1/2007 | Johnson et al. |
| 2007/0046040 A1 | 3/2007 | Chang |
| 2007/0125100 A1 | 6/2007 | Shoenfeld |
| 2007/0169525 A1 | 7/2007 | Chang |
| 2007/0188303 A1 | 8/2007 | Faro et al. |
| 2007/0245784 A1 | 10/2007 | Geringer et al. |
| 2007/0257773 A1 | 11/2007 | Hill et al. |
| 2007/0277571 A1 | 12/2007 | Gokcebay |
| 2008/0084836 A1 | 4/2008 | Baird et al. |
| 2008/0169657 A1 | 7/2008 | Horton et al. |
| 2008/0224481 A1 | 9/2008 | Geringer et al. |
| 2008/0246286 A1 | 10/2008 | Ostrowski |
| 2008/0252083 A1 | 10/2008 | Carabalona |
| 2008/0293019 A1 | 11/2008 | Dooley et al. |
| 2009/0102415 A1 | 4/2009 | Muchow et al. |
| 2009/0132090 A1 | 5/2009 | Kaczmarz et al. |

(56) References Cited

U.S. PATENT DOCUMENTS

| | | | |
|---|---|---|---|
| 2009/0282879 A1 | 11/2009 | Marcelle et al. | |
| 2010/0033329 A1 | 2/2010 | Davis et al. | |
| 2010/0141381 A1 | 6/2010 | Bliding et al. | |
| 2010/0253519 A1* | 10/2010 | Brackmann | B60P 3/03 340/572.1 |
| 2011/0012709 A1* | 1/2011 | Payson | G07C 9/00103 340/5.61 |
| 2011/0169614 A1* | 7/2011 | Mingerink | B05B 11/0005 340/10.4 |
| 2011/0172550 A1* | 7/2011 | Martin | A61B 5/7445 600/523 |
| 2011/0216364 A1 | 9/2011 | Konno et al. | |
| 2013/0067969 A1* | 3/2013 | Webb | E05B 47/00 70/78 |
| 2016/0025365 A1* | 1/2016 | Moudy | H04W 4/025 700/276 |
| 2017/0013071 A1 | 1/2017 | McCrea | |
| 2017/0053071 A1* | 2/2017 | Caputo | G06K 7/10366 |
| 2018/0253632 A1* | 9/2018 | Uland | G06K 19/0723 |
| 2019/0139638 A1* | 5/2019 | Keefe | G16H 20/13 |

OTHER PUBLICATIONS

NXP Semiconductors N.V.; SL3S1003_1013 UCODE G2iM and G2iM+ Product data sheet; Rev. 3.7; May 21, 2015 (43 pages).
Office Action dated Sep. 18, 2018 in U.S. Appl. No. 12/888,510.

* cited by examiner

FIG. 7

INVENTORY RUN MODE 89

| # | EPC VALUE | TotCnt | RD1Cnt | RD2Cnt | RDRate | RS1mx | RS2mx | Time t0 | Time tx | Thx-t0 | NoChg | Antenna |
|---|---|---|---|---|---|---|---|---|---|---|---|---|
| 1 | E280-1160-6000-0207-1144-833C | 661 | 661 | 0 | 22.6 | -36 | --- | 0.000 | 29.194 | 29.195 | 1 | N/A |
| 2 | E280-1160-6000-0207-1144-838C | 102 | 102 | 0 | 3.5 | -62 | --- | 0.006 | 28.976 | 28.971 | 4 | N/A |
| 3 | E280-1160-6000-0207-1144-832C | 635 | 635 | 0 | 21.8 | -57 | --- | 0.010 | 29.193 | 29.183 | 1 | N/A |
| 4 | E280-1160-6000-0207-1144-830C | 616 | 616 | 0 | 21.1 | -59 | --- | 0.012 | 29.196 | 29.184 | 1 | N/A |
| 5 | E280-1160-6000-0207-1144-831C | 581 | 581 | 0 | 19.9 | -62 | --- | 0.015 | 29.232 | 29.217 | 0 | N/A |
| 6 | E280-1160-6000-0207-1144-839C | 548 | 548 | 0 | 18.8 | -60 | --- | 0.018 | 29.195 | 29.177 | 1 | N/A |
| 7 | E280-1160-6000-0207-1144-71FC | 241 | 241 | 0 | 8.3 | -65 | --- | 0.237 | 29.223 | 28.985 | 5 | N/A |
| 8 | E280-1160-6000-0207-1144-835C | 227 | 227 | 0 | 8.0 | -62 | --- | 0.453 | 28.972 | 28.520 | 4 | N/A |

INVENTORY RUN MODE 89

| # | EPC VALUE | TotCnt | RD1Cnt | RD2Cnt | RDRate | RS1mx | RS2mx | Time t0 | Time tx | Thx-t0 | NoChg | Antenna |
|---|---|---|---|---|---|---|---|---|---|---|---|---|
| 1 | E280-1160-6000-0207-1144-833C | 1258 | 1258 | 0 | 20.6 | -36 | --- | 0.000 | 61.204 | 61.204 | 279 | N/A |
| 2 | E280-1160-6000-0207-1144-838C | 153 | 153 | 0 | 3.9 | -59 | --- | 0.006 | 38.940 | 38.935 | 563 | N/A |
| 3 | E280-1160-6000-0207-1144-832C | 809 | 809 | 0 | 22.0 | -57 | --- | 0.010 | 36.802 | 36.792 | 591 | N/A |
| 4 | E280-1160-6000-0207-1144-830C | 755 | 755 | 0 | 20.9 | -59 | --- | 0.012 | 36.175 | 36.162 | 599 | N/A |
| 5 | E280-1160-6000-0207-1144-831C | 727 | 727 | 0 | 20.3 | -61 | --- | 0.015 | 35.901 | 35.886 | 602 | N/A |
| 6 | E280-1160-6000-0207-1144-839C | 682 | 682 | 0 | 19.2 | -59 | --- | 0.018 | 35.502 | 35.484 | 607 | N/A |
| 7 | E280-1160-6000-0207-1144-71FC | 292 | 292 | 0 | 8.4 | -65 | --- | 0.237 | 34.950 | 34.713 | 615 | N/A |
| 8 | E280-1160-6000-0207-1144-835C | 278 | 278 | 0 | 8.2 | -62 | --- | 0.453 | 34.519 | 34.066 | 620 | N/A |
| 9 | E280-1160-6000-0207-1144-836C | 1 | 1 | 0 | 0.0 | -67 | --- | 34.202 | 34.202 | 0.000 | 624 | N/A |

86

SYSTEM AND METHOD FOR COMBINED ELECTRONIC INVENTORY DATA AND ACCESS CONTROL

PRIORITY CLAIM

This application claims the benefit of previously filed U.S. Provisional patent application entitled "SYSTEM AND METHOD FOR COMBINED ELECTRONIC INVENTORY DATA AND ACCESS CONTROL," assigned U.S. Ser. No. 62/547,922, filed Aug. 21, 2017, and which is incorporated herein by reference for all purposes.

FIELD OF THE SUBJECT MATTER

The presently disclosed subject matter generally relates to lock or access control systems, and more particularly to data control for electronically controlled lock systems such as may be applied to various storage enclosures or cabinets to provide secure storage of various items, equipment, materials, and/or information within the enclosures or cabinets. More specifically, certain present aspects may relate to associated and/or integrated inventory control, billing, diversion control, and/or inventory future utilization planning, all in connection with the ability to access a central server over a network such as an 802.11 WiFi wireless network.

BACKGROUND OF THE SUBJECT MATTER

Many occasions arise that require or make desirable access control of different cabinets, entryway doors, carts, tool boxes, and/or other types of boxes, hereafter (regardless generally of their compositions, materials, or configurations) collectively referred to as an enclosure or cabinet. Such enclosures or cabinets may be provided with doors and/or may also include removable storage boxes or drawers.

The need and/or desire for access control usually arises from the lack of security often provided by typical lock and key mechanisms. For example, a mechanical key may be lost or stolen. Once such a lost or stolen key has been surreptitiously obtained by an unauthorized individual, such individual in possession of such key may easily access the secured enclosure to either steal its contents, for example, as in the case of secured medicines or other controlled substances. Further, when such enclosures or cabinets are portable, issues can become compounded for tracking when and by whom such access took place. For controlled substances, it may be desirable and/or required to track what is referenced as a "chain of custody" in terms of who is responsible for accounting. "Chain of custody" in the present context is meant to be able to know and show who was in control of an item (for example, a controlled substance) minute-by-minute, so that that level of control can be established at every moment of a day or given time period. "Chain of custody" level of information and data can be advantageous for many practical reasons, but in some instances may be an absolute need, such as in the case of evidence in a legal matter.

Such shortcomings of keyed mechanical locks have contributed to the creation of the specialized field of electronic access control.

Typically, electronic access control may correspond to a three part system, including, for example: (1) a credential reader, (2) a microprocessor based control circuit, and (3) an electronic lock to open or unlock the enclosure being secured by the access control system.

Credential readers may include, but are not limited to: keypads, magnetic stripe card readers, proximity card readers, "ibuttons," smart card readers, and/or bar code card readers. In the recent past, there has been significant progress in the field of biometrics that includes, but is not limited to, the ability to reliably read and discern an individual's fingerprints, handprints, and retina and/or facial features.

Generally speaking, credential and/or biometric readers typically convert their applicable credential or biometric features, respectively, into a binary number. A microprocessor based system then reads and analyzes such binary number. Such systems are typically either standalone (attached to the reader) or networked (attached to many readers). Typically, they may read the binary number that corresponds to the potential entrant's credential or biometric features and compare it to a list of approved binary numbers. In such fashion, the microprocessor based system determines if the potential entrant has the right to access the enclosure or cabinet being secured by the access control system.

If the microprocessor based system determines that the subject credential or biometric feature under consideration is valid, access is granted to the enclosure. Typically, such is accomplished by the microprocessor turning on an electronic control circuit corresponding to solid state devices or relays which in turn provide a useable electrical voltage to open an electronic lock mechanism.

The electronic access control system may be networked to control multiple electronic locks for providing secure storage for many cabinets or enclosures, or individual doors and drawers in such cabinets or enclosures. Such electronic access control systems often require the management and control of various types of data associated with the electronic access system and/or a particular electronic lock, enclosure, or cabinet. For example, such electronic access control systems may include a significant amount of stored data regarding both users of the electronic access system and the electronic locks themselves. Typical user data may include: user name, credential type and ID, supervisor level, and valid access times. Typical lock data may include: lock name, access hardware (e.g. keypad or hardware), and open time. Electronic access control systems also typically include a database of relational data detailing which users can access or open which electronic locks.

Other types of data or information used in electronic control systems may include inventory data and/or audit trail data. Many occasions arise where there is an identified need to store and track individual items or particular types of items stored in a cabinet or enclosure. One such circumstance relates to the field of controlled medications (i.e. medicinal products) and, in particular, narcotics as may be administered to patients in a medical facility. Another application may be in the storage of tools or other parts in cabinets or enclosures. In such occasions, it may be desirable to maintain inventory data at the electronic lock as to the status of individual items or particular types of items stored in a cabinet or enclosure. Another aspect of inventory data gathering is a desire for a fully automated system to be implemented where possible, meaning that such specific data gathering is completely transparent to the user, such that the user is not required to make any specific effort. In other words, a fully automated system regarding inventory data would be one where the user is manipulating the inventory as needed for inventory usage purposes, while the system is otherwise keeping up with inventory data without requiring any special actions or attention of the inventory user.

It may also be desirable to store and track which users gained access to which cabinets or enclosures, as well as the time of such access by the user. Such information or data may be tracked and stored as audit trail data and conveyed in an audit trail report to a supervisor or other individual.

Certain access control systems also incorporate environmental monitoring systems that can record environmental data, such as temperature. For example, as is known in the medical profession, certain medications may be temperature sensitive and rendered unfit for use if not maintained within a given temperature range. Under such conditions, therefore, a need exists not only to secure such medications but to also continuously monitor the temperature at which they are stored. Such data may also be conveyed in an audit trail format to a supervisor or other individual.

The various data used or created by the access control system may need to be modified or updated, often on a regular basis, due to the continuously changing circumstances of the environment in which the access control system is used. For example, updates may need to be made as to which users can access which cabinets or enclosures. In the storage of medical products, updates may be desired which may include: settings of respective high and low temperature limits for the storage of the medical products, settings of the permitted time period outside such desired limits, settings of various alarms, and the setting of restricted access if certain limits are reached.

Access control systems may allow manipulation and control of the access control data at the actual electronic lock itself. In such circumstances, the updating and modification of access control data for each of the individual electronic locks may require a supervisor, serviceman, or someone of higher position than a "normal" user to go to the lock with a computer such as a laptop computer to perform the data updating and manipulation. In some systems, access control data may be updated on a central computer. Currently there are systems that will allow remote database manipulation and audit trail or other information downloads.

One specialized circumstance involves what may be referenced as a "narcotics box," which is transported such as on an ambulance (Emergency Medical Services vehicle) for use by EMS personnel, such as paramedics or other first responders. Furthermore, such narcotics box may be preloaded by a supervisor, and then carried onto an EMS vehicle for possible use during the course of a shift. For example, the current assignee provides a narcotics box for EMS vehicles, which is outfitted with an electronic lock to provide access control along with an audit trail. Communications may be via WiFi, Ethernet, or a completely non-network based arrangement. The box itself may be comprised of a heavy duty construction, such as seam welded 14 gauge steel, and have a scratch-resistant finish. Further, the box may have a built-in converter for dedicated power when used on an EMS vehicle, along with an auto-relocking door feature with mechanical key override.

Commonly owned US patents related to electronic lock subject matter include, for example, U.S. Pat. No. 6,116,067 entitled "Electronically Controlled Lock System for Tool Containers"; U.S. Pat. No. 7,145,434 entitled "System and Method for Key Control in an Electronic Locking System"; U.S. Pat. No. 7,380,426 entitled Panel Lock for Electronic, Electrical, or Control Cabinet"; U.S. Pat. No. 7,768,378 entitled Field Retrofittable Refrigerator Lock with Audit Trail"; U.S. Pat. No. 8,199,019 entitled "Field Retrofittable Refrigerator Lock with Temperature Monitoring, Temperature Based Access Control and Alarming"; U.S. Pat. No. 8,516,864 entitled "Electronic Latch Mechanism"; U.S. Pat. No. 8,742,889 entitled "Apparatus and Method for Electronic Access Control"; and U.S. Pat. No. 8,970,344 entitled "Method and System for Data Control in Electronic Locks."

In addition, inventory control generally involves the specific awareness of items and numbers of inventory items. In the context of a so-called narcotics box and stored controlled substances, such data ideally would be dosage and drug specific, as well as numerically specific.

In the subject of tracking individual pieces of inventory, a field has developed which relates to so-called radio frequency-based identification (RFID) technology. Very simply, RFID involves the use of electromagnetic fields for the purpose of automatically identifying (and therefore tracking) RFID tags attached to or associated with specific objects. One manufacturer called "Times-7" (Cupertino, Calif.) provides various limited profile UHF RFID antennas suitable for a range of space constrained applications, such as flush wall mounting or other restrictive environments faced by users. Another manufacturer called Impinj (Seattle, Wash.) provides high-performance, enterprise-class fixed RFID readers. Another manufacturer MEPS Real-Time, Inc. (Carlsbad, Calif.) combines RFID tagging with contents in a refrigerator to take inventory of everything that was removed or restocked back based on such RFID tags. MEPS has various US patents, including U.S. Pat. Nos. 7,812,774; 7,830,320; 7,911,402; 8,179,323; 8,384,545; 8,633,863; 8,686,859; 8,928,140; 9,013,307; 9,013,309; 9,189,769; and 9,223,934, and including published US patent applications including United States Patent Application Publication Nos. 20170013071 and 20110216364. Other companies such as Ruro (Frederick, Md.) and TERSO SOLUTIONS GMBH (Madison, Wis.) provide various inventory management systems. Another US patent disclosing the use of RFID is U.S. Pat. No. 9,536,359 entitled "Delivery system via electronic lockboxes."

The complete disclosures of all US patent publication-related documents referenced herein are fully incorporated herein by reference, and for all purposes.

While various implementations of data control for access control systems have been developed, no design has emerged that generally encompasses all of the desired characteristics as hereafter presented in accordance with the subject technology.

SUMMARY OF THE SUBJECT MATTER

In view of the recognized features encountered in the prior art and addressed by the presently disclosed subject matter, improved apparatus and methodology are presently disclosed for combined electronic inventory data and access control in electronic lock based access control systems. It is to be understood that the presently disclosed subject matter equally encompasses both apparatus and methodology.

In one exemplary configuration, an electronic access and inventory system may include tracking of a plurality of doses of controlled substances such that a virtual "chain of custody" is established and maintained. "Chain of custody" in the present context is meant to be able to know and show who was in control of an item (for example, a controlled substance) minute-by-minute, so that that level of control can be established at every moment of a day or given time period.

In accordance with certain aspects of certain embodiments of the presently disclosed subject matter, tracking may be established and maintained for a narcotics box or case location. In further detailed embodiments, the narcotics box or case contents (that is, the controlled substances-drugs) may be tracked.

In yet other exemplary embodiments, such tracking may specifically take place in the context of an ambulance narc box case/contents, involving such as EMS personnel, such that a complete record of custody of the case/contents is maintained from morning or start-of-shift removal from a central station, to throughout the work day, to return to station.

In accordance with yet additional aspects of certain embodiments of the presently disclosed subject matter, the electronic access system may be configured for placement of RFID tags directly on a "product" (or medicine dosage pak) such that the pak is destroyed or has altered performance (ID characteristic) when it is opened, thereby causing the RFID tag to no longer further operate in the same way as it did previously, to thereby read "removed" relative to maintained inventory information. Alternatively, in some embodiments, the RFID tag performance is modified in some trackable way whenever the pak or some frangible component thereof is "ruptured," such as reduced in performance for a relatively lower signal strength output, or such as having an ID that changes in response to a "tamper" indication.

In accordance with yet further aspects of certain embodiments of the presently disclosed subject matter, RFID tags may be provided preprogramed for corresponding to a particular drug or controlled substance to be stocked into a box, in order to eliminate the need for separate, individual enrollment of tags into the system. Further, per some embodiments, tagging may be color coated or otherwise visually enhanced for recognition and for human or robotic/automated handling. Increased speed of identification and handling can be of significant importance in a medical emergency setting that may be faced such as by EMS personnel.

For further exemplary embodiments, particularly for tracking methodology comprising a presently disclosed audit trail, EMS personnel may receive at the beginning of a shift receive a preloaded box or case to be mounted into their associated EMS vehicle. Once secured, an initial inventory may be taken of the contents as mounted into the vehicle. Thereafter, tracked transactions throughout a shift will eventually re reported, and a completed shift inventory will be taken relative to an initial inventory to determine cumulative usage throughout the shift for comparison with the detailed audit report of each individual withdrawal/transaction relative to the box during the course of the shift. Such augmented audit trail generation combined with electronic access control can result in improved inventory control, the generation of automated billing, improved diversion control, and in improved future planning based on determination of consumption patterns.

An exemplary embodiment of presently disclosed subject matter relates to a system for combined electronic inventory data and access control, comprising a closable enclosure; a plurality of respective RFID tags; an electronically actuated lock system; and an RFID reading system. Such plurality of respective RFID tags preferably have each a respective frangible component and are associated with respective consumable inventory items to be received in such enclosure, such RFID tags having an altered ID characteristic readable by an RFID reader once such frangible component thereof is ruptured for access to their respective consumable inventory items. Such electronically actuated lock system preferably is for selectively allowing locking and unlocking of such enclosure, and the RFID reading system is preferably associated with such enclosure, and adapted for determining at a selected time unruptured RFID tags received within such enclosure when closed, so as to identify corresponding respective consumable inventory items associated therewith.

Per some embodiments of the foregoing, such frangible component may comprise an external loop associated with the body of a respective RFID tag and positioned to be ruptured whenever such respective consumable inventory item thereof is accessed, and such altered ID characteristic thereof may be that such ID characteristic includes a flagged tamper bit as readable by an RFID reader whenever such RFID tag external loop is ruptured.

Per other embodiments of the foregoing, such frangible component may comprise the body of a respective RFID tag, and such altered ID characteristic thereof may be that such ID characteristic as readable by an RFID reader is eliminated whenever such RFID tag frangible body is ruptured.

In yet other embodiments, such frangible component may comprise the body of a respective RFID tag, and such altered ID characteristic thereof may be that such ID characteristic has relatively reduced signal strength as readable by an RFID reader whenever such RFID tag frangible body is at least partially ruptured.

For other variations of the foregoing, such closable enclosure may be lockable in a closed position thereof. For others, such RFID reading system may determine inventory of such enclosure at a plurality of times. In some such instances, such plurality of times may include at least one determination later in time than another determination to establish inventory changes in such enclosure during the interim between such two determinations. For example, involving an EMS crew in the field, one later time may be as the enclosure is closed in the field after attending a patient, so that the EMS crew is notified immediately about a missing item, while another time may be as the EMS crew checks in at the end of a shift. In still other embodiments, such inventory changes may comprise inventory either of removed from or added to such enclosure.

For some such exemplary systems, such electronically actuated lock system may be further adapted for maintaining an audit trail for actuation of such electronically actuated lock system and associating such audit trail with removed inventory to track chain of custody for such removed inventory. Per some such systems, an integrated inventory control system may be included in communication with such electronically actuated lock system.

For yet other such variations, such integrated inventory control system may be further adapted for providing visual readouts of audit reports for determining what inventory has been removed from or added to an enclosure and what inventory remains within such enclosure.

Per still other variations, such audit reports may include incident reports associated with particular inventory.

Some other alternatives may further include a central server communicating over an 802.11 WiFi wireless network for providing communications between such integrated inventory control system and such electronically actuated lock system. Per some such alternatives, a plurality of such closable enclosures may be provided, each having a respective electronically actuated lock system, and with such integrated inventory control system in communication with each of such closable enclosures via its respective electronically actuated lock system.

Still other variations of the foregoing involve further including a removable case receivable in such enclosure and having an associated non-frangible RFID tag for tracking of whether such removable case is received within such enclosure, such removable case further adapted for receiving therein such consumable inventory items and their respective RFID tags with respective frangible components. For some such variations, such RFID reading system is further adapted for determining whether such removable case with its associated non-frangible RFID tag is received within such enclosure when closed.

For yet other alternatives of the foregoing, such plurality of respective RFID tags with respective frangible components are associated with respective consumable inventory items comprising controlled drugs for use on a mobile EMS vehicle. For some such alternatives, such RFID tags with respective frangible components are respectively preprogramed for corresponding to a particular drug to be stocked in such enclosure. For some thereof, such RFID tags with respective frangible components are associated with respective visual markings to be read by a human user. In some such instances, respective color codings may be further included to be read by a human user for identifying particular drugs stocked in such enclosure.

For still other presently disclosed variations of the foregoing, such closable enclosure may include a lockable door. In some instances, such variations may further include paired sensors operatively associated with such door and such electronically actuated lock system for detection of whether such door is open or closed, and an external power cable for providing external power to such electronically actuated lock system.

Yet other alternatives involve such closable enclosure including a reinforced housing with a lockable door; and such electronically actuated lock system including an electronically movable latch and electronic access control circuit mounted within such reinforced housing, a user interface display and control panel mounted on the outside of such reinforced housing for controlling such movable latch into either of a locked or unlocked position thereof, and a corresponding stop member for preventing such enclosure door from being opened whenever such movable latch is in such locked position thereof. For various of the foregoing, such electronically movable latch may include one of a motorized latch, a solenoid, and an electronic prime mover.

For still other presently disclosed variations, such system may further include mounting door hinges for mounting of such door relative to such enclosure; an exterior handle on such enclosure; and a separate mechanical key override lock for such enclosure. Yet additional variations involve such enclosure defining small openings for mounting of such enclosure and for the passage of wiring between the interior and exterior of such enclosure. In some instances, such enclosure may be between 10 and 20 inches wide, between 6 and 15 inches tall, and between 6 and 12 inches deep.

For other alternatives of the foregoing, such electronically actuated lock system may include a credential reader, a microprocessor based control circuit, and an electronic lock to allow access to such enclosure whenever acceptable credentials are presented to such credential reader. In some such instances, such credential reader may include at least one of keypads, magnetic stripe card readers, proximity card readers, "ibuttons," smart card readers, bar code card readers, and biometric readers. For others, such microprocessor based control circuit may maintain a log of activities of such electronic lock for providing access to such enclosure. In some such instances, such log may include at least one of user name, credential type and ID, supervisor level, and valid access times. In some other instances, such system may further include a temperature sensor associated with such enclosure; and such microprocessor based control circuit may maintain temperature limit settings for stored inventory, and may monitor the output of such temperature sensor to set off an alarm if monitored temperatures are outside of limit settings. In yet other instances, such system may further include an environmental sensor for monitoring of at least one of temperature, humidity, and vibrations.

For other variations of the foregoing, such RFID reading system associated with such enclosure may further include a limited profile RFID antenna within such enclosure. In some such instances, such RFID antenna may comprise one of a UHF RFID antenna and an HF RFID antenna.

In other alternatives of the foregoing, such lockable enclosure may include an RFID antenna within such enclosure, and include electromagnetic shielding so to block any external electromagnetic fields, so that any RFID readings are limited to operative RFID tags and their associated contents which are within such enclosure when such door is closed. For some embodiments of the foregoing, a power source may be included for powering such electronically actuated lock system and such RFID reading system.

Yet another exemplary embodiment of presently disclosed subject matter relates to apparatus for combined current inventory data management and access control. Such apparatus may preferably comprise a lockable enclosure with a door which can be opened and closed under electronic lock control; an electronically actuated lock system for selectively allowing locking and unlocking of such enclosure by respective closing and opening of such door; and an RFID reading system associated with such lockable enclosure including an RFID antenna within such enclosure for determining the identity of respective enclosure contents having respective frangible RFID tags within such enclosure, which tags produce altered ID characteristics interoperative with such RFID reading system when ruptured. For such apparatus, such lockable enclosure preferably includes electromagnetic shielding so to block any external electromagnetic fields, so that any RFID readings are limited to RFID tags and their associated contents which are within such enclosure when such door is closed.

In some variations of the foregoing, each of such respective frangible RFID tags may include an external loop associated with the body thereof and positioned to be ruptured whenever such respective enclosure contents identified therewith are accessed, and such altered ID characteristic thereof may be that such ID characteristic includes a flagged tamper bit as readable by such RFID reading system whenever such frangible RFID tag external loop is ruptured.

In other variations of the foregoing, each of such respective frangible RFID tags may include a frangible body which is ruptured whenever such respective enclosure contents identified therewith are accessed, and such altered ID characteristic thereof may be that such ID characteristic as readable by such RFID reading system is eliminated whenever such RFID tag frangible body is ruptured. Alternatively, each of such respective frangible RFID tags may include a frangible body which is at least partially ruptured whenever such respective enclosure contents identified therewith are accessed, and such altered ID characteristic thereof may be that such ID characteristic has a relatively reduced signal strength as readable by such RFID reading system whenever such RFID tag frangible body is at least partially ruptured.

Yet another exemplary embodiment of presently disclosed subject matter may relate to a system for combined electronic inventory data and access control. Such a system may preferably include a closable enclosure; a plurality of respective frangible RFID tags associated with respective consumable inventory items to be received in such enclosure comprising controlled drugs for use on a mobile EMS vehicle, and wherein such RFID tags are adapted to at least partially rupture to produce altered ID characteristics for RFID reading whenever the contained drugs are acquired for administration; an electronically actuated lock system for selectively allowing locking and unlocking of such enclosure; and an RFID reading system, associated with such enclosure, and adapted for determining at a selected time unruptured frangible RFID tags received within such enclosure when closed, so as to identify corresponding respective consumable inventory items associated therewith.

In some such embodiments, each of such respective frangible RFID tags may include an external loop associated with the body thereof and positioned to be ruptured whenever such respective consumable inventory items associated therewith are acquired for administration, and such altered ID characteristic thereof may be that such ID characteristic includes a flagged tamper bit as readable by such RFID reading system whenever such frangible RFID tag external loop is ruptured.

For other variations, each of such respective frangible RFID tags may include a frangible body which is ruptured whenever such respective consumable inventory items associated therewith are acquired for administration, and such altered ID characteristic thereof may be that such ID characteristic as readable by such RFID reading system is eliminated whenever such RFID tag frangible body is ruptured. Alternatively, each of such respective frangible RFID tags may include a frangible body which is at least partially ruptured whenever such respective consumable inventory items associated therewith are acquired for administration, and such altered ID characteristic thereof may be that such ID characteristic has a relatively reduced signal strength as readable by such RFID reading system whenever such RFID tag frangible body is at least partially ruptured.

Another exemplary embodiment of the presently disclosed subject matter relates to an electronic access control system for inventory data and access control for electronically controlled lock systems, comprising a communications network; a plurality of electronic locks, respectively associated with a plurality of securable enclosures, and each of such locks having respective network communications devices for respectively connecting such each electronic lock with such communications network; and a central server, connected with such plurality of electronic locks over such network, and selectively providing at least one of data updates and management for each of such electronic locks. Per the foregoing, preferably, each of such securable enclosures includes a plurality of respective frangible RFID tags associated with respective consumable inventory items to be received in such respective enclosures, with such RFID tags adapted to at least partially rupture to produce altered ID characteristics for RFID reading by an RFID reader once their respective consumable inventory items are accessed; and a plurality of respective RFID reading systems, associated with each such respective enclosure, and adapted for determining at a selected time unruptured frangible RFID tags received within such enclosure when secured, so as to identify corresponding respective consumable inventory items associated therewith.

In some variations of the foregoing, each of such respective frangible RFID tags may include an external loop associated with the body thereof and positioned to be ruptured whenever such respective consumable inventory items associated therewith are accessed, and such altered ID characteristic thereof may be that such ID characteristic includes a flagged tamper bit as readable by an associated RFID reading system whenever such frangible RFID tag external loop is ruptured.

For other alternatives of the foregoing, each of such respective frangible RFID tags may include a frangible body which is ruptured whenever such respective consumable inventory items associated therewith are accessed, and such altered ID characteristic thereof may be that such ID characteristic as readable by an associated RFID reading system is eliminated whenever such RFID tag frangible body is ruptured. Alternatively, each of such respective frangible RFID tags may include a frangible body which is at least partially ruptured whenever such respective consumable inventory items associated therewith are accessed, and such altered ID characteristic thereof may be that such ID characteristic has a relatively reduced signal strength as readable by an associated RFID reading system whenever such RFID tag frangible body is at least partially ruptured.

Another exemplary embodiment of presently disclosed subject matter relates to an electronic access control system for inventory data and access control for use with an enclosure of the type having at least an exterior portion and a securable interior portion, comprising a microprocessor based access control circuit; a lock configured to be unlocked by such access control circuit; a plurality of respective frangible RFID tags associated with respective consumable inventory items to be received in such enclosure, with such RFID tags adapted to at least partially rupture to produce altered ID characteristics for RFID reading by an RFID reader system once their respective consumable inventory items are accessed; an RFID reading system associated with such enclosure, and adapted for determining at a selected time unruptured frangible RFID tags received within such enclosure when secured, so as to identify contents of such enclosure comprising corresponding respective consumable inventory items associated therewith; memory for storage of data associated with contents of such enclosure; and a user interface configured to provide a user access to such access control circuit through input data verified by such microprocessor, wherein such access control circuit is configured to unlock such lock based on input data verified by such microprocessor, and wherein such user interface is further configured to provide a user access to such memory for tracking contents of such enclosure.

In some variations of the foregoing, each of such respective frangible RFID tags may include an external loop associated with the body thereof and positioned to be ruptured whenever such respective consumable inventory items associated therewith are accessed, and such altered ID characteristic thereof may be that such ID characteristic includes a flagged tamper bit as readable by such RFID reading system whenever such frangible RFID tag external loop is ruptured.

In other variations, each of such respective frangible RFID tags may include a frangible body which is ruptured whenever such respective consumable inventory items associated therewith are accessed, and such altered ID characteristic thereof may be that such ID characteristic as readable by such RFID reading system is eliminated whenever such RFID tag frangible body is ruptured. Alternatively, each of such respective frangible RFID tags may include a frangible body which is at least partially ruptured whenever such respective consumable inventory items associated therewith are accessed, and such altered ID characteristic thereof may be that such ID characteristic has a relatively reduced signal strength as readable by such RFID reading system whenever such RFID tag frangible body is at least partially ruptured.

Yet another exemplary embodiment of presently disclosed subject matter may relate to an electronic access control system for inventory data and access control for use with a plurality of securable enclosures and a central control server, comprising a plurality of microprocessor based access control circuits; a plurality of locks, configured to be respectively and controllably unlocked by such plurality of access control circuits; and a plurality of respective frangible RFID tags associated with respective consumable inventory items to be received in such respective enclosures, with such RFID tags adapted to at least partially rupture to produce altered ID characteristics for RFID reading by an RFID reader system once their respective consumable inventory items are accessed; a plurality of respective RFID reading systems, associated with each such respective enclosure, and adapted for determining at a selected time unruptured frangible RFID tags received within such enclosure when secured, so as to identify contents of such enclosure comprising corresponding respective consumable inventory items associated therewith; a plurality of communication means, respectively associated with each of such access control circuits, for communication via an associated communications network between an associated central control server and each of such access control circuits, whereby access to an associated plurality of securable enclosures may be centrally controlled via electronically based communications from an associated central server.

For some of the foregoing, each of such respective frangible RFID tags may include a respective frangible component thereof. Alternatively, each of such respective frangible components of such respective RFID tags may comprise at least one of (1) an external loop associated with the body thereof and positioned to be ruptured whenever such respective consumable inventory items associated therewith are accessed, and such altered ID characteristic thereof is that such ID characteristic includes a flagged tamper bit as readable by an associated RFID reading system whenever such frangible RFID tag external loop is ruptured; (2) a frangible body which is ruptured whenever such respective consumable inventory items associated therewith are accessed, and such altered ID characteristic thereof is that such ID characteristic as readable by an associated RFID reading system is eliminated whenever such RFID tag frangible body is ruptured; and (3) a frangible body which is at least partially ruptured whenever such respective consumable inventory items associated therewith are accessed, and such altered ID characteristic thereof is that such ID characteristic has relatively reduced signal strength as readable by an associated RFID reading system whenever such RFID tag frangible body is at least partially ruptured.

It is to be understood that the presently disclosed subject matter equally encompasses both apparatus and corresponding and/or associated methodology. For example, one presently disclosed exemplary embodiment of methodology for combined electronic inventory data and access control, may comprise providing a closable enclosure with an electronically actuated lock system for selectively allowing locking and unlocking of such enclosure; providing a plurality of respective frangible RFID tags associated with respective consumable inventory items to be received in such enclosure, such RFID tags producing altered ID characteristics interoperative with an RFID reading system once at least partially ruptured for access to their respective consumable inventory items; associating an RFID reading system with such enclosure; and determining with such RFID reading system at a selected time unruptured frangible RFID tags received within such enclosure when closed, so as to identify corresponding respective consumable inventory items associated therewith.

In variations of the foregoing, each of such respective frangible RFID tags may include a respective frangible component thereof. Alternatively, each of such respective frangible components of such respective RFID tags may comprise at least one of (1) an external loop associated with the body thereof and positioned to be ruptured whenever such respective consumable inventory items associated therewith are accessed, and such altered ID characteristic thereof is that such ID characteristic includes a flagged tamper bit as readable by such RFID reading system whenever such frangible RFID tag external loop is ruptured; (2) a frangible body which is ruptured whenever such respective consumable inventory items associated therewith are accessed, and such altered ID characteristic thereof is that such ID characteristic as readable by such RFID reading system is eliminated whenever such RFID tag frangible body is ruptured; and (3) a frangible body which is at least partially ruptured whenever such respective consumable inventory items associated therewith are accessed, and such altered ID characteristic thereof is that such ID characteristic has relatively reduced signal strength as readable by such RFID reading system whenever such RFID tag frangible body is at least partially ruptured.

Another exemplary embodiment of presently disclosed subject matter relates to methodology for providing combined electronic inventory data and access control for controlled drugs for use on a mobile EMS vehicle, preferably comprising providing a closable enclosure having an electronically actuated lock system for selectively allowing locking and unlocking of such enclosure by an authorized user; associating an RFID reading system with such enclosure; associating a plurality of respective frangible RFID tags with respective consumable inventory items to be received in such enclosure comprising controlled drugs for use on a mobile EMS vehicle, with such RFID tags adapted to at least partially rupture to produce altered ID characteristics for RFID reading whenever the contained drugs are acquired for administration; using such RFID reading system to determine at selected times unruptured frangible RFID tags received within such enclosure when closed, so as to identify corresponding respective consumable inventory items associated therewith; and storing in a memory tracking data corresponding to the identification data determined by such RFID reading system.

In some variations of the foregoing, each of such respective frangible RFID tags may include an external loop associated with the body thereof and positioned to be ruptured whenever such respective consumable inventory items associated therewith are acquired for administration, and such altered ID characteristic thereof may be that such ID characteristic includes a flagged tamper bit as readable by such RFID reading system whenever such frangible RFID tag external loop is ruptured.

In other variations, each of such respective frangible RFID tags may include a frangible body which is ruptured whenever such respective consumable inventory items associated therewith are acquired for administration, and such altered ID characteristic thereof is that such ID characteristic as readable by such RFID reading system is eliminated whenever such RFID tag frangible body is ruptured. Alternatively, each of such respective frangible RFID tags may include a frangible body which is at least partially ruptured whenever such respective consumable inventory items associated therewith are acquired for administration, and such altered ID characteristic thereof may be that such ID characteristic has a relatively reduced signal strength as readable by such RFID reading system whenever such RFID tag frangible body is at least partially ruptured. Another presently disclosed exemplary embodiment of presently disclosed subject matter relates to methodology for an electronic access control system for inventory data and access control for electronically controlled lock systems, preferably comprising providing a communications network; providing a plurality of electronic locks, each of such locks having respective network communications devices for respectively connecting such each electronic lock with such communications network; respectively associating such plurality of locks with a plurality of securable enclosures; providing each of such securable enclosures with a plurality of respective frangible RFID tags associated with respective consumable inventory items to be received in such respective enclosures, with such RFID tags adapted to at least partially rupture to produce altered ID characteristics for RFID reading by an RFID reader once their respective consumable inventory items are accessed; providing each of such securable enclosures a plurality of respective RFID reading systems, associated with each such respective enclosure, and adapted for determining at a selected time unruptured frangible RFID tags received within such enclosure when secured, so as to identify corresponding respective consumable inventory items associated therewith; using such RFID reading systems, selectively establishing data at such respective enclosures for identifying corresponding respective consumable inventory items associated therewith; providing a central server connected with such plurality of electronic locks over such network; and selectively providing at least one of data updates and data management for each of such electronic locks, conducted by such central server over such network.

Per variations of the foregoing, each of such respective frangible RFID tags may include a respective frangible component thereof. Furthermore, in some instances, each of such respective frangible components of such respective RFID tags may comprise at least one of (1) an external loop associated with the body thereof and positioned to be ruptured whenever such respective consumable inventory items associated therewith are accessed, and such altered ID characteristic thereof may be that such ID characteristic includes a flagged tamper bit as readable by an associated RFID reading system whenever such frangible RFID tag external loop is ruptured; (2) a frangible body which is ruptured whenever such respective consumable inventory items associated therewith are accessed, and such altered ID characteristic thereof may be that such ID characteristic as readable by an associated RFID reading system is eliminated whenever such RFID tag frangible body is ruptured; and (3) a frangible body which is at least partially ruptured whenever such respective consumable inventory items associated therewith are accessed, and such altered ID characteristic thereof may be that such ID characteristic has relatively reduced signal strength as readable by an associated RFID reading system whenever such RFID tag frangible body is at least partially ruptured.

Yet another exemplary embodiment of presently disclosed subject matter may relate to methodology for secured inventory management for inventory data and access control through use of an electronic access control system and a securable enclosure of the type having at least an exterior portion and a securable interior portion, preferably comprising associating with a securable enclosure a lock configured to be unlocked by an access control circuit; providing a plurality of respective frangible RFID tags associated with respective consumable inventory items to be received in such enclosure, with such RFID tags adapted to at least partially rupture to produce altered ID characteristics for RFID reading by an RFID reader system once their respective consumable inventory items are accessed; associating an RFID reading system with such enclosure; using such RFID reading system at a selected time for determining unruptured frangible RFID tags received within such enclosure when secured, so as to identify contents of such enclosure comprising corresponding respective consumable inventory items associated therewith; providing memory for storage of data associated with contents of the associated securable enclosure as determined at selected times with such RFID reading system; and receiving and validating credentials from a user, in order to provide access by the user to contents of the associated securable enclosure by configuring the access control circuit to unlock the lock based on validated credentials from such user.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which:

FIGS. 7 and 8, respectively, depict exemplary computer screen readout images according to one exemplary embodiment of the presently disclosed subject matter;

Figure 1:
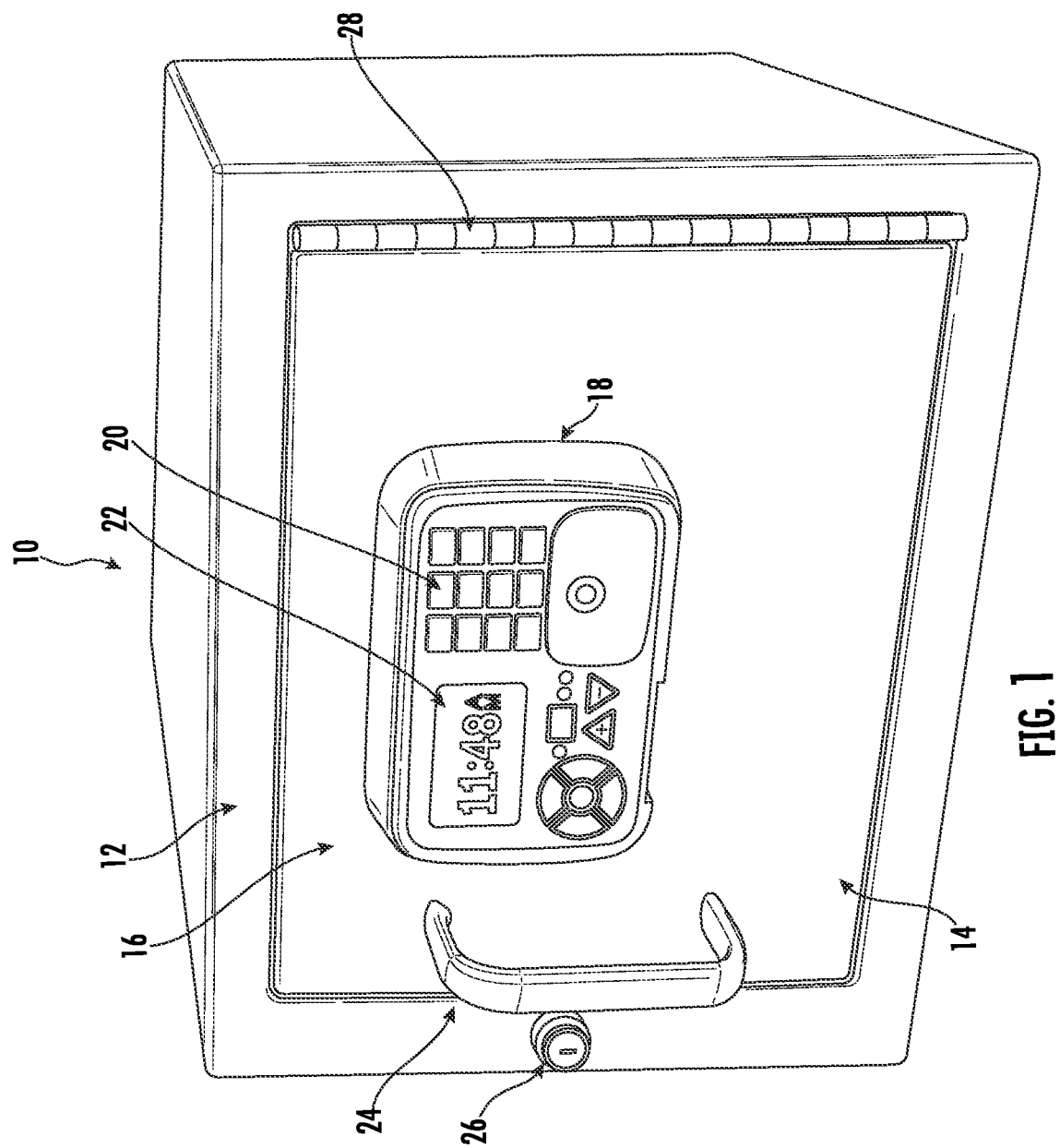
FIG. 1 depicts an upper right isometric view of an image of an exemplary representative enclosure with a representative door thereof in a closed and locked position, further illustrated with an exemplary lock provided in accordance with one embodiment of the presently disclosed subject matter installed thereon.

Repeat use of reference characters throughout the present specification and appended drawings is intended to represent same or analogous features, elements, or steps of the presently disclosed subject matter.

DETAILED DESCRIPTION OF THE PREFERRED EMBODIMENTS

As discussed in the Summary of the Subject Matter section, the presently disclosed subject matter is concerned with combined electronic inventory data and access control for electronically controlled lock systems.

Selected combinations of aspects of the disclosed technology correspond to a plurality of different embodiments of the presently disclosed subject matter. It should be noted that each of the exemplary embodiments presented and discussed herein should not insinuate limitations of the presently disclosed subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

It should be specifically noted that while the present disclosure generally describes the lock disclosed herein as a retrofittable lock, such terminology should not be taken as a limitation of the presently disclosed subject matter in any way as the presently disclosed lock may, indeed, be provided as original equipment.

The presently disclosed subject matter relates to inventory data and access control, integrated into electronically controlled lock systems. Such electronically controlled lock systems may include one or more electronic locks used to provide secure storage of various items within a cabinet or drawer. An exemplary electronic lock may include a motorized latch and an electronic access control circuit mounted within a reinforced housing and provided as either a retrofittable lock or as original equipment for a cabinet or enclosure. User interfaces may be provided through an LCD display and control panel mounted on the face of the housing, or otherwise.

Additionally, various optional transducers, such as a temperature transducer may be provided for installation within some cabinets or enclosures where an environmental condition to be monitored is of importance. A motorized latch may engage a corresponding hole, or strike, or other stop member, for preventing the cabinet door from being opened.

It is to be understood by those of ordinary skill in the art that the presently disclosed subject matter equally encompasses other optional features, different than just an optional temperature transducer. For example, one or more optional devices may be utilized with the presently disclosed subject matter to detect a variety of environmental conditions, or other conditions. For example, either or both of temperature and humidity may be detected relative to a room or a piece of equipment, of vibrations levels or other characteristics of such room/equipment may be monitored.

Reference will be made in detail to the various exemplary embodiments of an electronic lock in accordance with the presently disclosed subject matter. Referring to the drawings, FIG. 1 depicts an upper right isometric view of an image generally 10 of an exemplary representative enclosure generally 12 with a representative door 14 thereof in a closed and locked position, further illustrated with an exemplary lock generally 16 provided in accordance with one embodiment of the presently disclosed subject matter installed thereon and other presently disclosed subject matter therein. Lock 16 includes a main housing 18 including electronic assembly, battery pack, and communications port features. Otherwise, a programming keypad 20, display 22, handle 24, separate mechanical key override lock 26, and door hinges 28 are provided. Lock 16 may be variously attached to cabinet 12 and door 14 by incorporation into a formed opening (not shown) in door 14, or otherwise attached (details of which form no particular aspect of the presently disclosed subject matter).

Figure 2A:
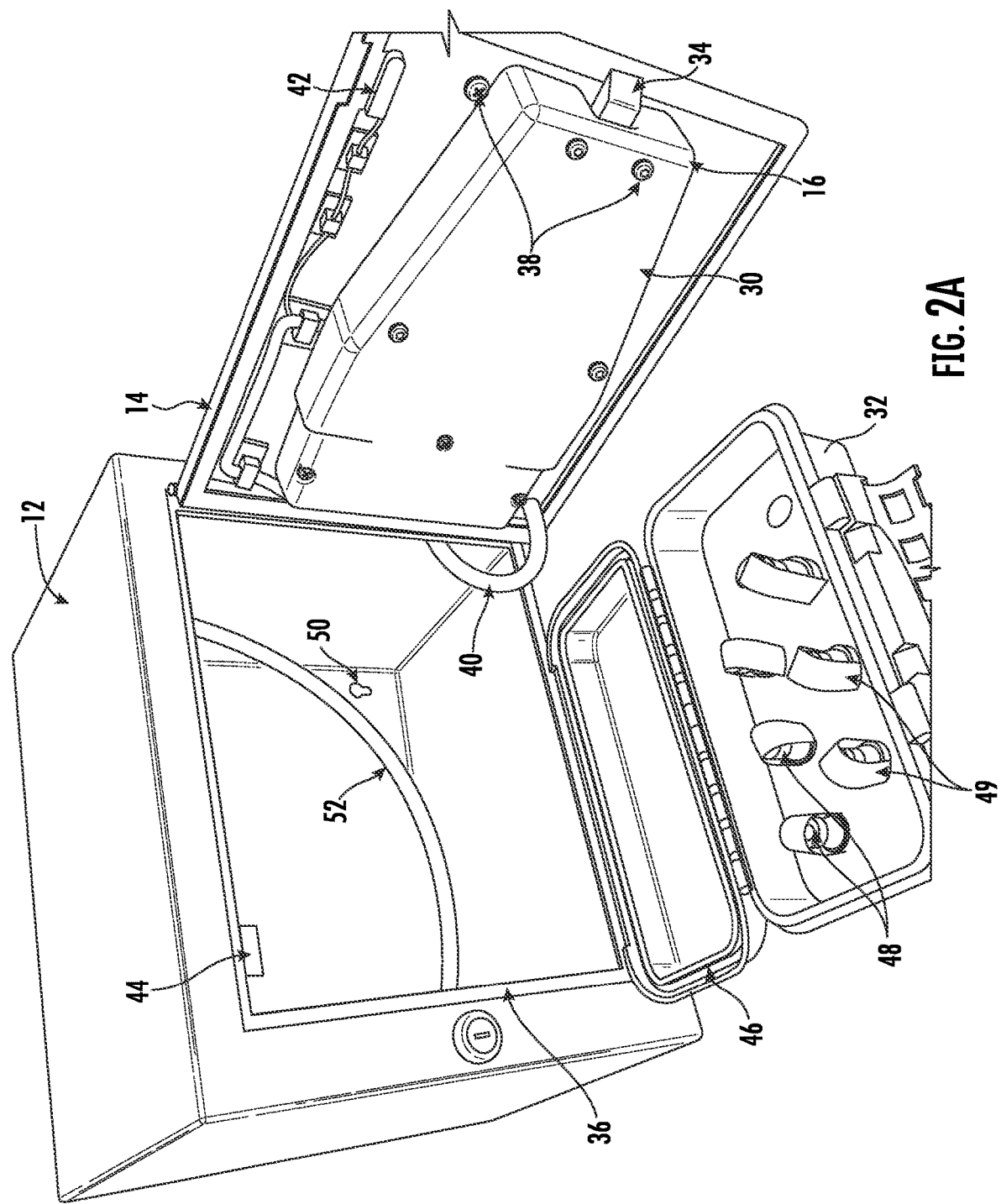
FIG. 2A depicts an upper left isometric view of an image of the exemplary representative enclosure of FIG. 1 with a representative door thereof in an open position, further illustrated with an exemplary lock provided in accordance with one embodiment of the presently disclosed subject matter installed thereon, and with such enclosure associated with a removable storage unit (or box) for storage therein.

FIG. 2A depicts an upper left isometric view of an image of the exemplary representative enclosure 12 of FIG. 1 with a representative door 14 thereof in an open position, further illustrated with an exemplary lock back cover generally 30 provided in accordance with one embodiment of the presently disclosed subject matter installed thereon, and with such enclosure associated with a removable storage unit (or box) 32 for storage therein. Lock 16 (shown from its back side) is configured for a selectively extending member generally 34 to engage a strike edge 36 of enclosure 12 that, when properly positioned, keeps the cabinet 12 locked.

Strike edge 36 may be integrally formed with cabinet 12 or provided by other appropriate means, details of which form no particular aspect of such locking feature. Various mounting screws 38 or their equivalents may be provided for securing back 30 to door 14. Also, a cable (not seen) generally under cover 30 may in some embodiments connect front and rear portions of lock 16 on either side of door 14. In other embodiments, the rear portion of lock 16 may directly communicate through the door with the front portion of such lock. A cable 40 may be used for providing power from an associated vehicle to lock 16.

Further, magnetic sensors 42 and 44, or other forms of sensors, may be mounted in conjunction with door 14, to detect its open or closed condition, which may be communicated to lock 16 such as through wiring as illustrated (in FIG. 2A).

As will be understood by those of ordinary skill in the art from the complete disclosure herewith, lock 16 amounts to a motorized or controllably driven latch, which may make use of such as a motor or solenoid (not shown) or other type of prime mover for operating extendable member 34. In some exemplary embodiments, a permanent magnet DC motor may be used; however, various types of motors can be employed. Also, when used, a motor may be provided with a gear train that moves a mechanism which in turn retracts or extends element 34.

As discussed in conjunction with the complete disclosure herewith, cabinet 12 when opened allows access to a stored box or storage unit 32. Such removable box 32 may itself have an openable lid 46, which when opened allows access to stored medicinal dosages 48. Such dosages may comprise individual pills, capsules, or vials of drugs to be injected, as well known to those of ordinary skill in the art. As also shown in FIG. 2A, each dosage 48 is associated with its own respective RFID tag 49. While in some instances a given tag may simply have information regarding a specific drug in terms of its associated contents, in other instances more information or data may be stored in or by a tag. For example, the lot number, expiration date, purchase date, and similar data could be stored. As represented, such tags 49 are configured and situated in accordance with presently disclosed subject matter to be frangible, so that they are ruptured or destroyed when an inventory user accesses the inventory item 48. When a tag 49 is destroyed in such fashion (by normally accessing its associated dosage 48), such tag 49 stops its RFID function. In accordance with the presently disclosed subject matter, such fact is eventually tracked by the inventory data system of the presently disclosed subject matter, which shows such associated dosage 48 as removed from inventory.

As shown, cabinet 12 may include openings 50 for mounting of cabinet 12 and/or for the passage of wiring (generally 52) between the interior and exterior of cabinet 12. Such wiring 52 may extend around within the cabinet 12 interior to emerge (wiring 40) adjacent to lock 16 to provide vehicle power for lock 16 in accordance with presently disclosed subject matter, as otherwise discussed herein.

Because RFID technology can be fairly robust, in some instances, it's possible that a given form of RFID tag selected for use in a particular implementation may tend to have reduced level outputs rather than to stop working altogether when "ruptured" or damaged as individual dosages are accessed. In such an implementation, the presently disclosed subject matter is applicable to indicate removed dosages by still using the comparative tracking methodology disclosed herewith. However, rather than tracking for just, in effect, a "zero" result while checking for the presence of a particular RFID tag, the comparison is to determine a change in the relative signal strength (RSSI) associated with such given tag. A particular implementation in such embodiment would involve determining a desired threshold level of reduction in RSSI to indicate that an adequate amount of physical changes ("damage") to the RFID tag had occurred, such that it signals a dosage has been accessed. Such determination in accordance with presently disclosed methodology would involve ensuring that a sufficiently lowered RSSI threshold were selected for such assurance, while still distinguishing from relatively smaller changes in RSSI which may occur simply, for example, from a given RFID tag being situated in a relatively slightly harder to read location.

Figure 2B:
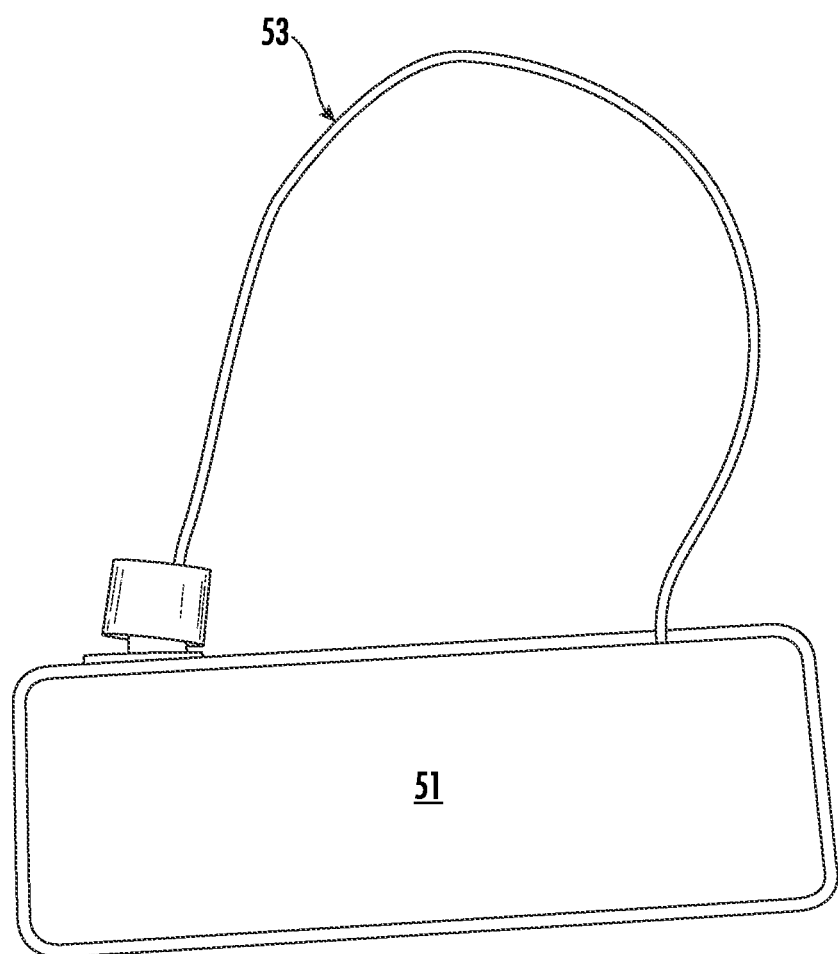
FIG. 2B depicts an exemplary alternative RFID tag for use in another exemplary embodiment of the presently disclosed subject matter.

Another alternative embodiment and methodology in accordance with presently disclosed subject matter involves using an RFID tag that has a tamper evident bit. FIG. 2B depicts an exemplary alternative RFID tag (generally 51) for use in such an alternative exemplary embodiment of the presently disclosed subject matter.

In particular RFID tag 51 may have a trace or external loop of wire (generally 53), which when broken, causes a "tamper" bit to be set in the RFID tag 51. That means that the RFID tag 51 puts out a changed ID after loop 53 is broken than before loop 53 is broken. By using the same comparative tracking methodology of the presently disclosed subject matter, such change in ID is detected and used to determine that a previously enclosed individual dosage has been accessed.

A variety of techniques may be used, as will be understood by those of ordinary skill in the art, to incorporate such an RFID tag 51 into a physical arrangement to result in breaking of loop 53 whenever the dosage is accessed. For example, with reference to FIG. 2A, loop 53 may be positioned similarly to tag 49 and secured such that loop 53 is forced to be broken in order to access the associated dosage 48. Thereafter, since the associated tag 51 will have a changed ID, exercise of the comparative tracking methodology of the presently disclosed subject matter determines that such individual dosage 48 has been accessed, as corresponds with that particular tag 51.

One exemplary such tag is a commercially available product from NXP Semiconductors, referenced as the UCODE G2iM series transponder integrated circuits (IC's), including a so-called "tag tamper alarm." The chip bits of such an exemplary device are shown below in Table 1, indicating that a single bit in provided, indicative of whether the associated loop 53 is intact or broken.

TABLE 1

| Indicator bits | | | | Temporary bits | | | Permanent bits |
| --- | --- | --- | --- | --- | --- | --- | --- |
| | | | | | Transparent | | Conditional Read |
| Tamper indicator | External supply indicator | RFU | RFU | Invert Output | mode on/off | Data mode data/raw | Range Reduction on/off |
| 0 | 1 | 2 | 3 | 4 | 5 | 6 | 7 |

To facilitate human interaction, such RFID tags may be associated with color coordinated containers so that particular colors are associated with particular corresponding drugs and/or dosages. In the instance of using an exemplary RFID tag embodiment such as exemplary tag 51, the user may identify a particular color in order to select a desired drug and/or dosage, while the tracking technology presently disclosed will detect breaking of the associated wire or loop 53 in order to automatically determine and track (record) which dosage has been accessed. In the context of this embodiment of the presently disclosed subject matter, an "unruptured" RFID tag would mean that the wire or loop 53 has not been broken, and the ID characteristic from such unruptured RFID tag would show that a tamper bit or indicator thereof has not been set or flagged (and thus remains at "0").

More generally speaking, as various embodiments of the presently disclosed technology are utilized, all embodiments commonly make comparative tracking assessments, so that a tag no longer seen, or a tag seen at an RSSI level below a determined threshold, or a tag seen with a tamper evident indication, all result in detection that a corresponding protected/enclosed dosage was accessed. Thus, a "frangible" RFID tag as referenced by the presently disclosed subject matter is intended to refer to tags which themselves have frangible components, such as the body thereof, and/or have an associated external wire or loop or other feature thereof, the rupture of which frangible component causes a change or alteration to the ID characteristics of such RFID tag. Such changes can be elimination altogether of the ID characteristic, or a relatively reduced signal strength thereof, or setting or flagging of a tamper evident bit.

Figure 3:
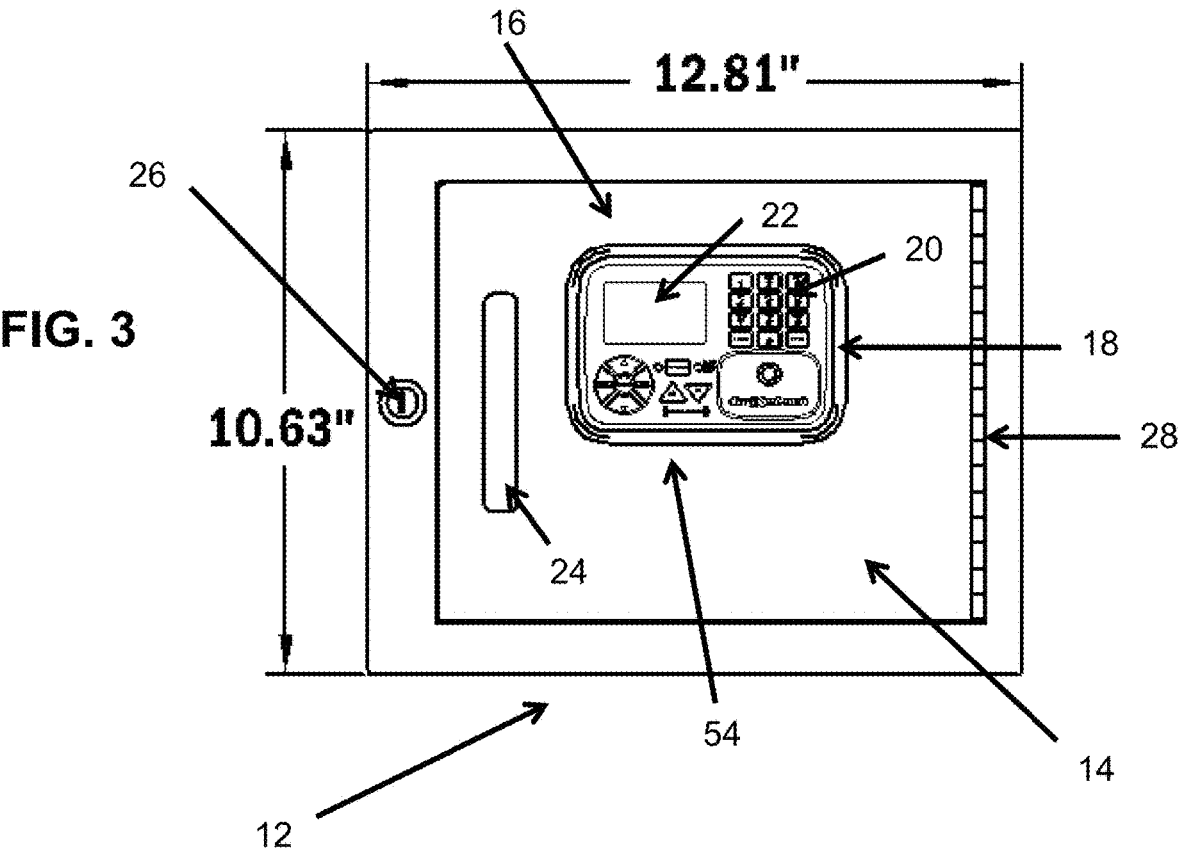
FIG. 3 depicts a front elevation view drawing of an exemplary enclosure similar to that of FIG. 2A but in a closed position thereof, and with exemplary marked dimensions.
Figure 4:
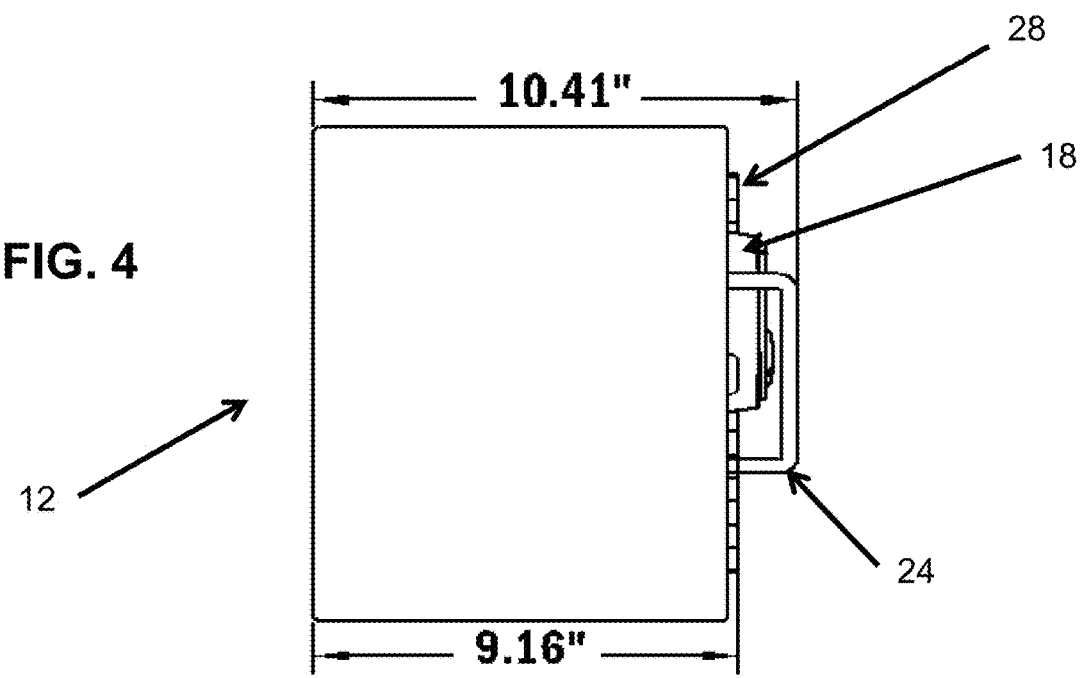
FIG. 4 depicts a side elevation view drawing of the exemplary enclosure of FIG. 2A, also in a closed position thereof, and with exemplary marked dimensions.

FIGS. 3 and 4, respectively, depict front and side elevation view drawings of an exemplary enclosure generally 12 similar to that of FIG. 2A but in a closed position thereof, and with exemplary marked dimensions. Reference characters repeated in FIGS. 3 and 4 from FIGS. 1 and 2 are intended to represent same or analogous features of the presently disclosed subject matter, without requiring additional explanation. The FIG. 3 front view of cabinet 12 additionally represents navigation keys generally 54 on the face of lock main housing 18, along with keypad 20 and display 22. Such navigation keys aid in programming certain operational characteristics of the lock in accordance with the presently disclosed subject matter. Between navigation keys 54 and keypad 20, representative buttons and functionality may include such as a back button, an enter button, a down button, and an up button. In an exemplary embodiment, display 22 may correspond to an LCD display; however, other types of displays may also be employed. Such buttons and the display are used to navigate a menu based programming scheme. The programming scheme is used to select or unselect various programming options within a lock constructed in accordance with the presently disclosed subject matter.

FIGS. 3 and 4 also represent exemplary dimensions of an exemplary cabinet 12, useful for mounting or carry in an EMS vehicle. As shown, an exemplary width and height may be about 12.81 inches by 10.63 inches. Further, a depth at the handle may be 10.41 inches, while a depth at the hinges may be 9.16 inches.

Extending member 34 is operated under the control of a microprocessor based circuit located within lock main housing 18. In accordance with the illustrated exemplary embodiment of the presently disclosed subject matter, electronic lock 16 receives input from a user attempting to gain access to the cabinet via the exemplary keypad 20 shown on the face of housing 18. It should be appreciated by those of ordinary skill in the art that a variety of different types of access control credentials may be used instead of or in addition to such keypad. Such credentials may include, but are not limited to, proximity cards, magnetic stripe cards, smart cards, RF fobs, IR fobs, and Dallas Semiconductor i-Buttons, as well as a plethora of biometric type access control technologies available to industry.

When electronic lock 16 receives data, in an exemplary case a personal identification number (PIN) from a user, it processes the PIN and determines the validity of the code. Typically, the electronic lock will have a number of available valid codes. In accordance with an exemplary embodiment, anywhere from 250 to 1000 valid codes may be provided, or even higher numbers for some embodiments, such as up to 5000 or higher. It should be appreciated, however, that such number is a design limitation of particular installations, and not a particular limitation of broader aspects of the presently disclosed subject matter. Electronic lock 16 is configured to compare an entered PIN to its list of pre-programmed valid codes. If the code is determined to be valid, access is granted. Lock 16 can be programmed manually or through a personal computer (PC) based program.

Figure 5:
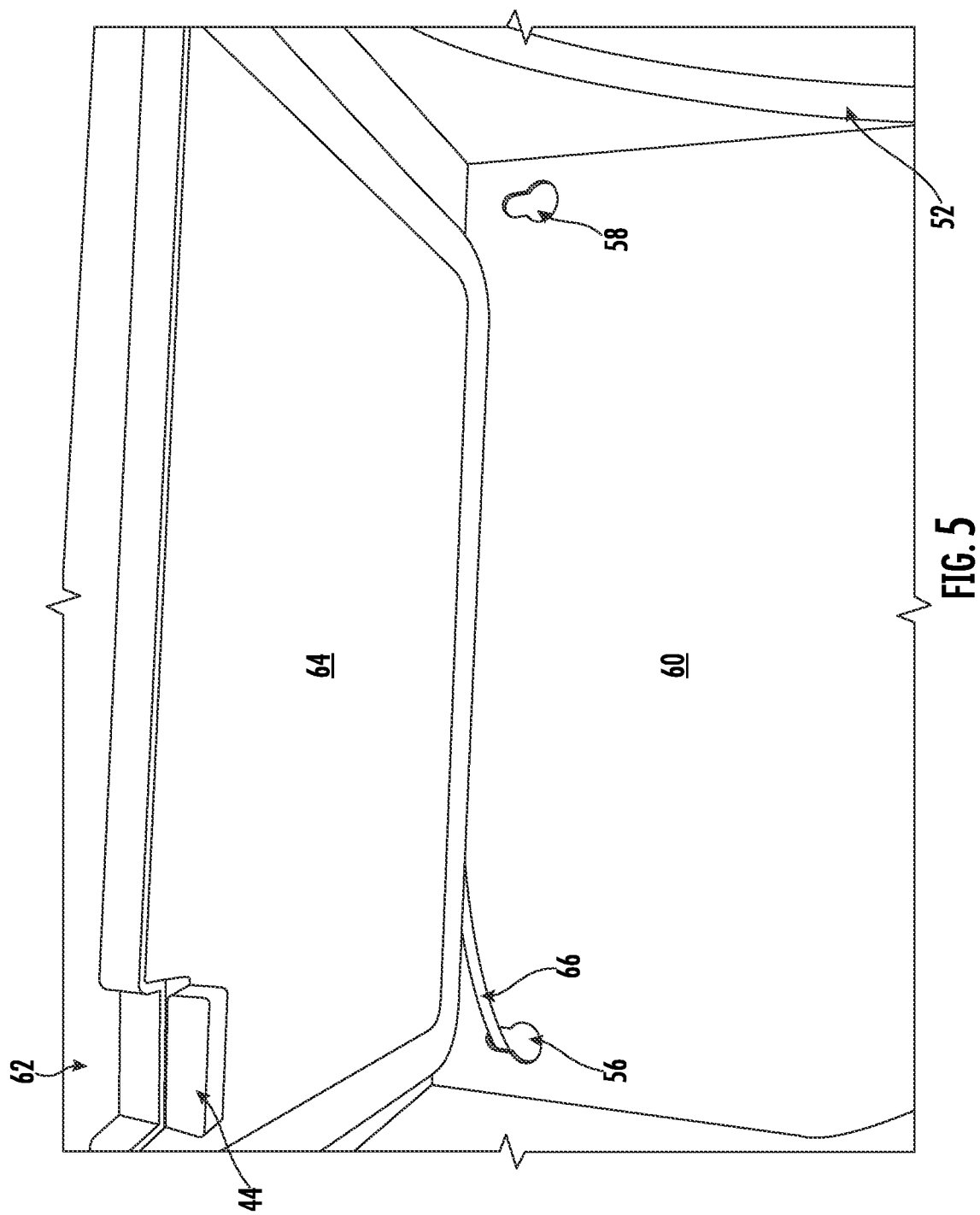
FIG. 5 is an isometric view of an image of an exemplary interior related feature of a presently disclosed exemplary enclosure, and representing an exemplary RFID antenna placement in accordance with presently disclosed subject matter.

FIG. 5 is an isometric view of an image of an exemplary interior related feature of a presently disclosed exemplary enclosure. As otherwise referenced herein, wiring 52 may enter the interior (generally 60) of an enclosure via such as a mounting hole formed in such enclosure. Additional such holes (keyhole-shaped in this embodiment) 56 and 58 are illustrated as formed in a back wall of enclosure, opposite what would be a door of the enclosure. A magnetic sensor 44 or similar may be associated with detecting the position of such a door (not illustrated), as otherwise discussed herein.

On the underside of a top surface 62 of such enclosure, an antenna generally 64 may be mounted in accordance with presently disclosed subject matter. Generally, it is preferable that such an antenna be operative as a UHF RFID antenna and suitable for an RFID sensing system, within the subject enclosure. One example of a useful antenna for such a system is available from "Times-7" (Cupertino, Calif.). One such model is the Times-7 Model A5010 Circular Polarized Antenna, which provides an ultra-low profile design available in a compact 250 mm/10 inch square footprint. As shown, such model also accommodates a flush wall mounting on upper interior surface 62.

Antenna 64 may be connected to wiring, such as wiring 66 which passes through opening 56, as illustrated by exemplary FIG. 5.

Figure 6:
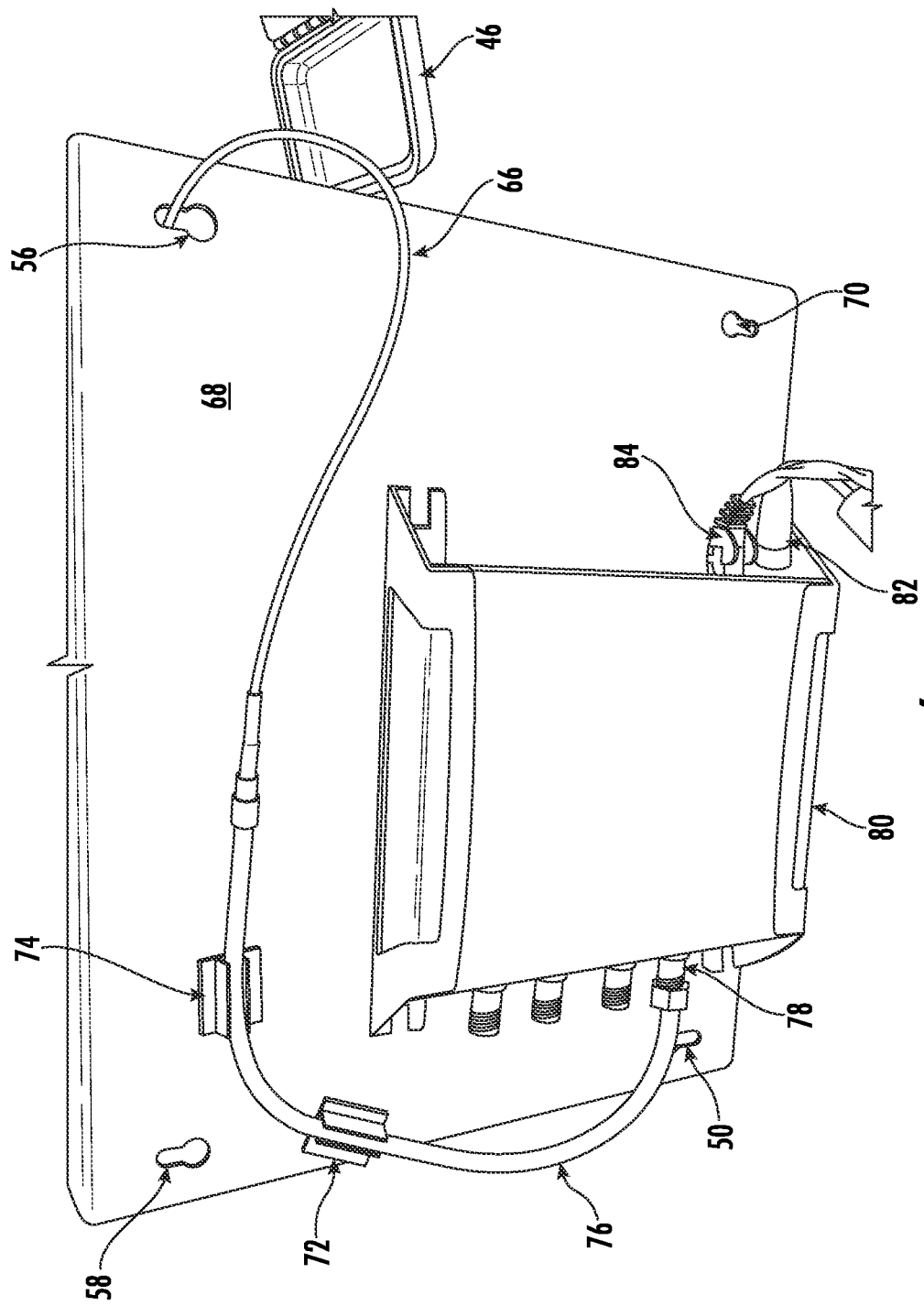
FIG. 6 depicts an image of an exemplary external (rear side) view of an exemplary enclosure of the presently disclosed technology, including RFID-related features associated therewith in combination, according to one exemplary embodiment of the presently disclosed subject matter.

FIG. 6 depicts an image of an exemplary external (rear side) view of a rear wall generally 68 of an exemplary enclosure of the presently disclosed technology, including RFID-related features associated therewith in combination, according to one exemplary embodiment of the presently disclosed subject matter. The more complete image of the rear side of back or rear wall 68 as illustrated in FIG. 6 shows an exemplary four respective mounting holes or openings 50, 56, 58, and 70. Further, exemplary mounting clips 72 and 74 may be affixed to such rear wall portion of wall 68, for receiving wiring 66 and/or extensions 76 thereof, as illustrated. Wiring 66 and/or an extension 76 thereof terminates in connector 78, which may be associated with an RFID reader device, generally 80, as discussed herein.

FIG. 6 illustrates in effect a prototype arrangement, whereby the RFID antenna 64 of FIG. 5 (in the interior 60 of an enclosure) is connected via wiring 66 and/or 76 with an RFID reader generally 80. An exemplary such reader is the "Impinj" brand Model Speedway R420 RAIN RFID reader. Such a device is a high-performance, enterprise-class fixed reader that allows for the ability to create a contiguous read zone, in this instance, inside of enclosure or cabinet 12. Such device also allows operational modes for high throughput, high tag density uses. In the exemplary set-up of FIG. 6, a power cord 82 and internet connection 84 are also associated with RAIN RFID reader 80. Other models of "Impinj" brand reader assemblies may be utilized in particular installations, and include, but are not limited to, for example, Models RS500, RS1000, and RS2000. In each instance, such devices may be utilized as a module which is affixed to another circuit board involved with implementation of the presently disclosed subject matter combinations.

RAIN RFID technology is derived from an alliance which seeks universal adoption of UHF RFID technology, similar to the way other wireless technology organizations have advanced such as WiFi and Bluetooth technologies. Specifically, RAIN uses a GS1 UHF Gen2 protocol which ISO/IEC has standardized as 18000-63. The term RAIN is an acronym derived from RAdio frequency IdentificatioN. It is intended in part as a reference to the link between UHF RFID and the cloud, where RFID-based data can be stored, managed and shared via the Internet connection 84. As a result, a RAIN RFID solution allows use of a reader to read and write a tagged item, manage data, and respond.

While UHF RFID is specifically discussed in the presently disclosed subject matter, such subject matter equally may encompass use of HF RFID, such that the presently disclosed subject matter is not limited to any specific frequency range of use or practice, either now or later existing.

In this instance, the associated enclosure 12 can be modified, as needed, to create the formation of a so-called "Faraday Cage" effect, whereby the enclosure 12 is used to block any external electromagnetic fields, so that any RFID readings are strictly limited to contents (RFID tags) which are within the enclosure 12 once its door is closed. A Faraday shield may be formed by a continuous covering of conductive material or by a mesh of such materials. One shielding aspect for some embodiments herewith may include the use of conductive gasketing around the perimeter of door 14. The resulting shield phenomenon protects the reading antenna 64 from external radio frequency interference (RFI), since the enclosure 12 conducts current around the outside of the enclosed space with none passing through the interior 60.

FIGS. 2A and 6 illustrate the open lid 46 of an exemplary removable box 32, which when opened (in part, in some instances, by rupturing an associated RFID tag 49) allows access to stored medicinal dosages 48. As noted above, such dosages may comprise individual pills, capsules, or vials of drugs to be injected, which may be respectively included in their own smaller container (see FIG. 2A), as well known to those of ordinary skill in the art. Examples of some controlled substances may include Fentanyl, Morphine, Midazolam (aka Versed), Diazepam (aka Valium), and Lorazepam (aka Ativan). One efficiency of the presently disclosed subject matter is that tags may be prepared which are preprogramed for corresponding to particular of such drugs, to eliminate more time-consuming enrollment otherwise of generic tags. For example, tags 49 may be provided that specifically correspond to, for example, Fentanyl, and the RFID system will be able to know that the narc box has X number of containers of Fentanyl (and Y numbers of containers of Versed, and Z number of containers of Ativan, etc.). Such feature of the presently disclosed subject matter allows for simple inventory of drug types without the specific (time consuming) need of specifically tagging (and recording, data entering, etc.) every specific container of a medication. Also, other advantages of presently disclosed subject matter is that such RFID tags may be placed directly on the vials or a container for them such that the tags are physically destroyed in order to open the vial or individually packaged medicinal doses. Another possible advantage is use of color coding, to prevent unauthorized users from understanding the particular contents of a given item. In general, tagging may be color coated or otherwise visually enhanced for recognition and for human or robotic/automated handling. Increased speed of identification and handling for dosages 48 can be of significant importance in a medical emergency setting that may be faced such as by EMS personnel. Likewise, the use of automation (automated data capture features) for operation of the presently disclosed inventory data control system means that EMS personnel do not have to be distracted with "record keeping" at perhaps critical times in conduct of their primary roles with their patients being treated.

In addition to monitoring the contents (medicinal dosages) of an enclosure (or narc case), the location of such narc case itself can be tracked, the location of the EMS vehicle or ambulance bearing such narc case and its contents may be tracked, and associated EMS personnel may be tracked, all as part of the presently disclosed subject matter. The result is that a complete record of custody of the case and contents may be obtained. Such record covers from a narcotics case morning or start-of-shift removal from a station to through the day, and to return to station.

FIGS. 7 and 8, respectively, depict exemplary computer screen readout images generally 86 according to one exemplary embodiment of the presently disclosed subject matter. As understood by those of ordinary skill in the art from the complete disclosure herewith, the subject RFID antenna and reader configuration in combination with the controlled access enclosure as disclosed herewith, may be used to automatically determine the operating RFID tags 49 stored with the subject enclosure (narc box). It is to be understood since RFID tags 49 are destroyed by removal of associated contents 48 that the indication of an RFID tag 49 stored within the enclosure 12 means that the associated contents of such RFID tag or tags 49 are within the enclosure 12, per the presently disclosed subject matter. Thus, as represented by FIG. 7, an associated inventory run sets up identification of what all was "originally" within the enclosure (such as at the start of an EMS crew shift). In the example illustrated, there are eight lines, each respectively representing a dosage 48 with its associated RFID tag 49 intact (and operable). While variations may be practiced, color highlights, such as in lines 2, 7, and 8 of the FIG. 7 exemplary illustration, means that some significant data is accumulating relative to the corresponding dosage 48. Data points relative to enclosure 12 take place with the door 14 to the enclosure 12 closed. Reference character 88 of FIGS. 7 and 8 point to exemplary highlighted line 2, to reflect that the item otherwise fully identified on such line has notable data. Columns 89 of FIGS. 7 and 8 concern "Total Count." FIG. 7 illustrates for example that communications with the RFID tag 49 associated with the dosage 48 of line 2 are fewer (a count of 102 illustrated in Column 89 for line 2) than, for example, the associated RFID tag 49 for line 1 (reflecting a contact count of 661 in Column 89 for line 1 of FIG. 7). As the amount of time increases since a tag has been read (the total count number does not increase relative to time), the row becomes more pink. The number of read cycles that have occurred since no change in its read status is shown in Columns 90 of FIGS. 7 and 8. FIG. 8 represents an inventory check at a point in time, for example, that all dosages have been removed, so all reporting lines 1 through 8 are highlighted in red, to reflect such fact (see reference character 90). As shown in FIG. 8, all of the No Change numbers of Column 90 are relatively high, and all lines are flagged red accordingly. As shown in FIG. 7, the No Change numbers in Column 90 for lines 2, 7, and 8 are relatively higher than for the other lines, so those are flagged in pink. Once the total count number has not increased in some time, and the "No Change" number is high, the data indicates that an RFID tag 49 has probably been removed from the area (interior 60 of enclosure 12) that the antenna 64 is seeing/reading. As will be understood by those of ordinary skill in the art from the complete disclosure herewith, the computer screen readout examples of FIGS. 7 and 8 may be practiced in conjunction with any of the embodiments disclosed herewith, including those which make use of tags which become completely inoperative when "ruptured," those which have relatively reduced RSSI characteristics when damaged, and those which have a changed ID characteristic bit when some component thereof is affected.

As should be further understood from the complete disclosure herewith, such augmented audit trail generation combined with electronic access control can result in improved inventory control, the generation of automated billing, improved diversion control, and in improved future planning based on determination of consumption patterns. That is because report summaries can provide information on a variety of information, such as case location at all times (using RFID and/or other techniques for tracking the narc case), case content changes by time, and narc box access.

One audit trail exemplary method may involve the steps of:
  EMS personnel receives case from supervisor at the beginning of a work shift;
  EMS personnel shows access control card to narc box and gains access;
  EMS personnel opens secured door to enclosure;
  EMS personnel inserts narc case into narc box;
  EMS personnel closes secured door to enclosure;
  RFID reader scans narc box for case number and contents (report #1);
  EMS personnel shows access control card to narc box and gains access;
  EMS personnel opens secured door to enclosure;
  EMS personnel removes narc case;
  EMS personnel closes secured door to enclosure;
  EMS personnel potentially utilizes selected drugs from narc box, including destroying RFID tag for any drugs used, in order to gain actual access to such drugs;
  EMS personnel shows access control card to narc box and gains access;
  EMS personnel opens secured door to enclosure;
  EMS personnel inserts narc case into narc box;
  EMS personnel closes secured door to enclosure;
  RFID reader scans narc box for case number and contents (report #2)
  Inventory control system compares report #1 to report #2 and defines what RFID tags are different;
  The removal, closing, and scan steps are repeated possibly numerous times—each time creating a report;
  EMS personnel shows access control card to narc box and gains access;
  EMS personnel opens secured door to enclosure;
  EMS personnel removes narc case;
  EMS personnel closes secured door to enclosure;
  EMS personnel returns case to supervisor.

Variations to such methodology may be practiced. For example, the supervisor may use an RFID scanning approach to identify a narc case after it has been preloaded for a shift by the supervisor, to confirm the narc case and its contents at the start of a shift. Similarly, the supervisor can use an RFID scanning approach to identify a narc case and its contents after it has been returned at the end of a shift.

Also, the access control system may provide a data-logging feature. That is, users will have the ability to view and download various data associated with the electronic lock, including "audit trail" data and possibly other recorded data. Such history can be viewed by pressing a designated button, such as an "up" button, on the keypad, which will display selected data; or by pressing a "down" button on the keypad, which will display other selected data. Such data can be logged in predetermined increments with the size of the increment being set by the system administrator or supervisor. In addition, the system is provided with the ability to connect a personal computer (PC) and download all the data related to a given enclosure. Automation of the inventory data features of the presently disclosed subject matter may be achieved, for example, by conducting an RFID inventory read triggered by door 14 opening and closing as sensed by magnetic switch or sensors 42, 44. As will be understood by those of ordinary skill in the art, the resulting "audit trail" or inventory data and related may be processed for desired information. For example, by knowing who accessed a given narc box when it was opened and the case removed, and knowing who accessed the narc box when the case was returned, and knowing the difference in the contents of the returned box versus the removed box, it may be logically determined what user (for example, EMS personnel) took what items (dosages 48) and when.

Additionally, the system is provided with the ability to connect individual electronic locks over a network to a central server. The network connections may be either hardwired or wireless, such as through an RF interface or through an 802.11 WiFi wireless network. Data and programming associated with individual locks and the access control system may be remotely downloaded/uploaded from or to the central server through the network. As used herein, a network may include a dial-in network, a local area network (LAN), wide area network (WAN), public switched telephone network (PSTN), the Internet, intranet or other type(s) of networks, now or later existing, including hybrid and/or meshed networks. A network may include any number and/or combination of hard-wired, wireless, or other communication links.

In accordance with the presently disclosed subject matter, system settings can be made through a control panel on the front of the system, such as through a PC based access control system that is either directly connected to the lock or remotely connected to the lock over a network.

Figure 9:
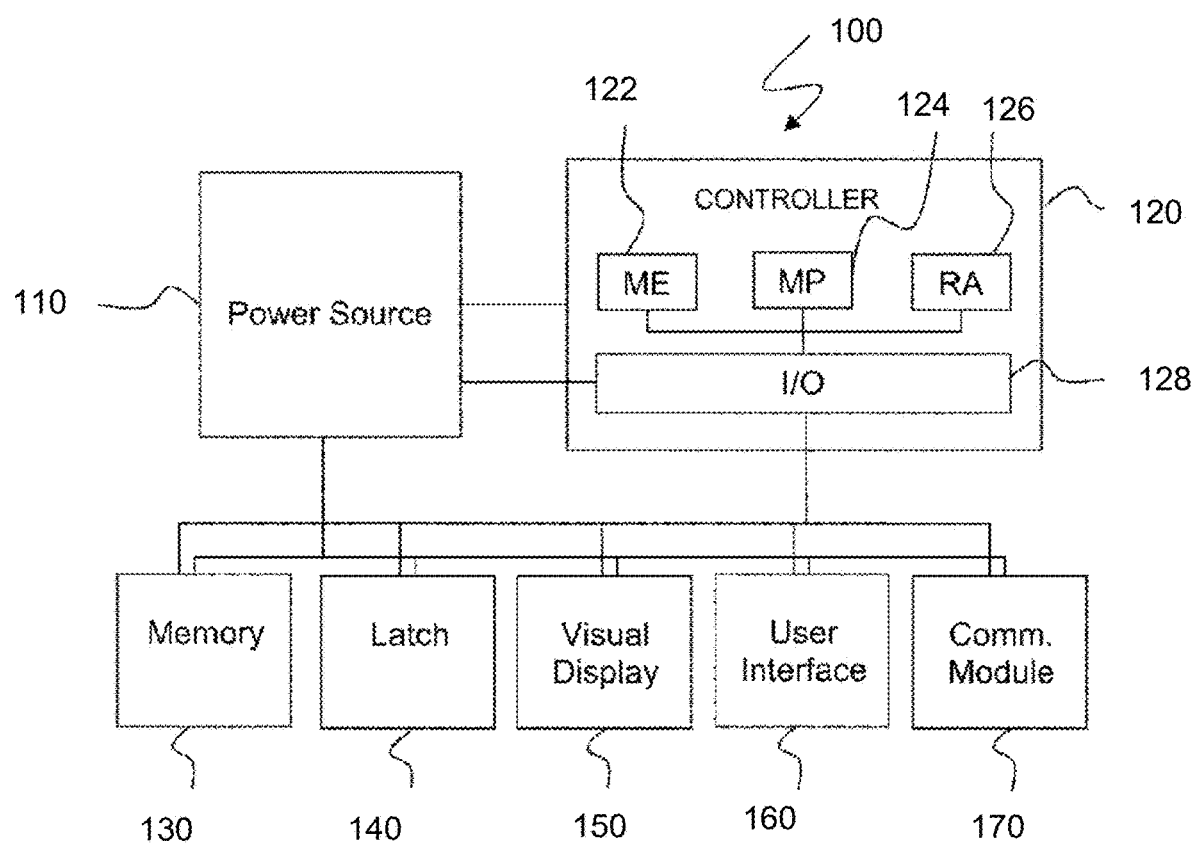
FIG. 9 depicts a block diagram of an exemplary electronic lock according to one exemplary embodiment of the presently disclosed subject matter.

FIG. 9 depicts a block diagram of an exemplary electronic lock according to one exemplary embodiment of the presently disclosed subject matter. Referring to FIG. 9, a block diagram of an exemplary electronic lock 100 is shown in accordance with one embodiment of the presently disclosed subject matter. As illustrated, electronic lock 100 may include a power source 110, a controller 120, memory 130, latch 140, visual display 150, user interface 160, and communications device or module 170. Power source 110 may be any power device for supplying power to the electronic lock 100. For instance, power source 110 may be a battery pack or other power pack that provides electrical power to electronic lock 100.

Power source 110 is operatively connected to both the controller 120 and to the various other components of the electronic lock. The controller 120 may have the capability to direct the power supply 110 to selectively provide power to the various components of the electronic lock 100 or to remove power from the various components of the electronic lock 100. For instance, the controller 120 may be configured to control when the communications device or module 170 receives power from the power supply 110 so that the controller 120 may selectively power on or power off the communications module 170 in accordance with certain aspects of the presently disclosed subject matter, as will be discussed in detail below with reference to FIG. 10.

Controller 120 is the main processing unit of electronic lock 100. Controller 120 may include a memory 122, microprocessor 124, random access memory 126, and input/output device 128, as shown in FIG. 9. Those of ordinary skill in the art, using the teachings provided herein, should appreciate that the presently disclosed subject matter is not limited to any particular controller 120, but may include any device configured to control the various components of the electronic lock 100.

Controller 120 may be programmed with various instructions to perform various functions in accordance with aspects of the presently disclosed subject matter. For instance, controller 120 may include one or more computing devices that are adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to, application-specific circuits. Of course, combinations of computer-executed software and hard-wired logic or other circuitry may be suitable, as well. In a typical implementation, the controller could use a microcontroller chip attached to a memory device as well as other hardware to assist with various functions. The microcontroller could execute a special-purpose program produced using any programming language or combination of languages as may be suitable for the purpose, and as may exist or be later developed. While presently disclosed subject matter lends itself to the use of separate chips for the CPU, memory, and other interface logic, the design would be just as applicable if some or all of those functions were combined into one or more larger chips.

Electronic lock 100 may include a memory 130 connected to the controller 120. Memory 130 may be used to store various types of data associated with electronic lock 100 and/or an electronic access control system. For instance, memory 130 may be used to store user data, such as, user name, credential type and ID, supervisor level, and valid access times; lock data, such as lock name, access hardware (e.g. keypad or hardware), and open time; relational data detailing which users can access or open which electronic locks; and audit trail data and/or inventory data.

Electronic lock 100 may include a latch mechanism 140 that is operatively connected to controller 120. Latch mechanism 140 may be similar to the electronic latch assembly discussed above or may be any other latch mechanism configured to secure a cabinet or enclosure. In a preferred exemplary embodiment, whenever latch mechanism 140 receives a command from controller 120, the latch assembly unlocks the cabinet or enclosure for which the electronic latch 100 is used to provide secure storage.

The subject embodiment of a present electronic lock may further include a visual display 150 and user interface 160. Such visual display 150 and user interface 160 allow for a user to input and/or manipulate data or other information into the lock and to visually inspect certain settings, features, and/or data or other information associated with the lock. The visual display 150 and user interface 160 may be similar to the user interface and visual display depicted in FIGS. 1 and 4, or may have any other configuration that allows for the display and manipulation of data or other information at the electronic lock.

Still referring to FIG. 9, controller 120 may be operatively connected to communications module 170 which is used to interface electronic lock 100 to a network, to a computing device, or to other electronic locks. Communications module 170 may be any device for enabling communication with other electrical devices. For example, the communications module may be a modem, a Bluetooth communications module, an RF communications module, or any other device that enables communications with a network or remote device. In a particular embodiment, communications module 170 may be a modem adapted to enable communications over an 802.11 WiFi wireless network.

Figure 10:
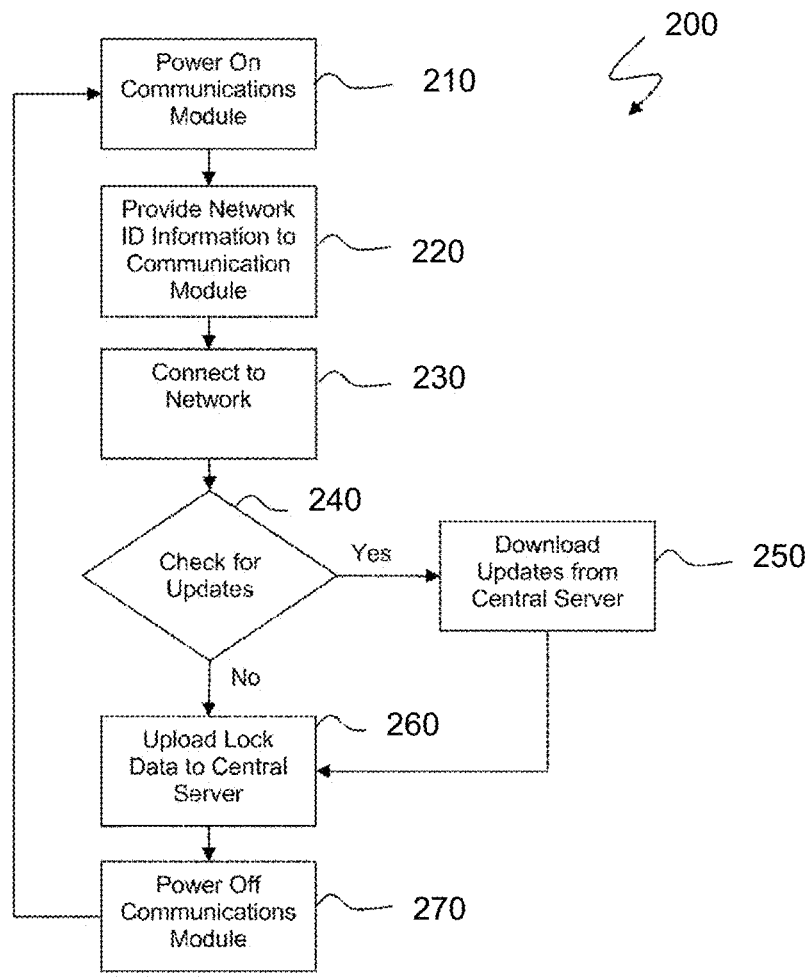
FIG. 10 depicts exemplary steps associated with a method according to one exemplary embodiment of the presently disclosed subject matter.

FIG. 10 depicts exemplary steps associated with a method according to one exemplary embodiment of the presently disclosed subject matter. With reference to FIG. 10, an exemplary method generally 200 for enabling network communication over an 802.11 WiFi wireless network will be discussed in detail. At step 210, a communications module of an electronic lock is powered on. The communications module may be powered on pursuant to programmed instructions from the electronic lock or pursuant to the manual pressing of a button on the electronic lock or other triggering event that directs the communications module of the electronic lock to power on.

At step 220, network identification information is provided to the communications module. Such network identification information must be provided to the communications module to allow the communications module to connect to and communicate over the network. Such information may include, for example, the SSID of the 802.11 WiFi network, the appropriate encryption pass keys to enable access to the WiFi network, and/or the IP address of the central server. Once the network identification information has been provided to the communications module, the communications module can connect the electronic lock to the network, as shown at step 230. The electronic lock can then communicate with a central server or other remote device over the network and can receive and transmit data over the network.

At step 240, the electronic lock checks for updates from the central server. If updates are available, then the electronic lock downloads such updates and stores them in memory as shown at step 250. For instance, the electronic lock may download new relational data which identifies which users can access the cabinet or enclosure secured by the electronic lock. At step 260, the electronic lock uploads data, such as audit trail data or inventory information to the central server. In such manner, audit trail data, inventory data, and other data stored at the individual locks may be updated to a central location periodically over the network without a supervisor having to visit each individual lock in the field.

At step 270, the communications module of the electronic lock may be powered off to conserve power supply resources. The electronic lock may be programmed to power off the communications module after a predetermined time interval after the communications module has been powered on. In addition, the electronic lock may be programmed to power off the communications module once all updates have been downloaded from the central server and once all lock data, such as audit trail data and inventory data, have been uploaded to the central server.

The presently disclosed subject matter allows for the interfacing of many electronic locks to a central server over an 802.11 WiFi wireless network while preserving limited power supply resources available with electronic locks. For facilities already have existing 802.11 WiFi wireless networks, the presently disclosed subject matter facilitates the implementation of an electronic access control systems using existing infrastructure. The networked connection of electronic locks to a central server allows for the updating of many electronic locks simultaneously and facilitates the tracking of lock data such as audit trail data and inventory data from a central location, providing significant advantages.

By connecting a plurality of electronic locks over a network, a supervisor or other user can then update electronic access control data used by the locks in one of two ways. The supervisor or other user can provide updates to the electronic lock at the individual lock, or the supervisor or other user can provide the updates into a central server, which then communicates each of those updates to the individual electronic locks.

An access control system capable of updating multiple electronic locks simultaneously, such as over a WiFi network or other network, may generate database control problems. Low end database control systems utilizing, for example, Microsoft Access, lose significant reliability if multiple database manipulations occur simultaneously. In order to accomplish multiple reliable database manipulations simultaneously, a more sophisticated database management system may be required. However, using such a sophisticated database management system creates difficulties in implementation, as microprocessors in electronic locks that can communicate with these databases are expensive. Moreover, such microprocessors do not lend themselves to low energy consumption.

Figure 11:
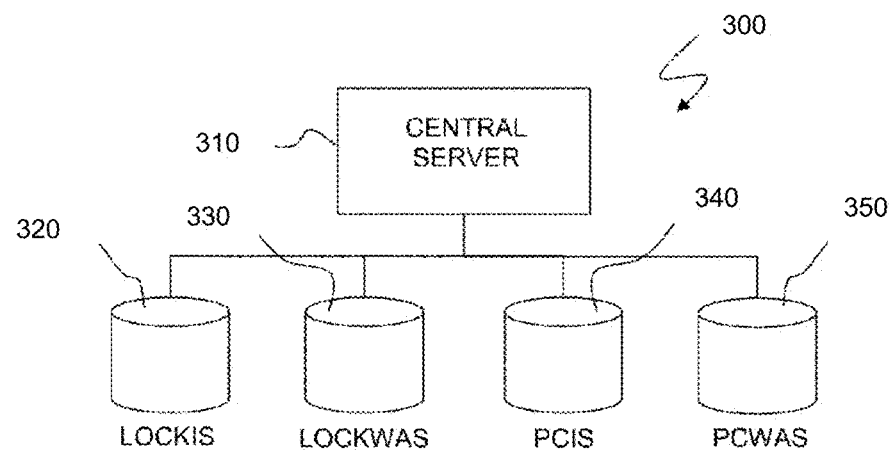
FIG. 11 depicts a database system according to one exemplary embodiment of the presently disclosed subject matter.
Figure 12:
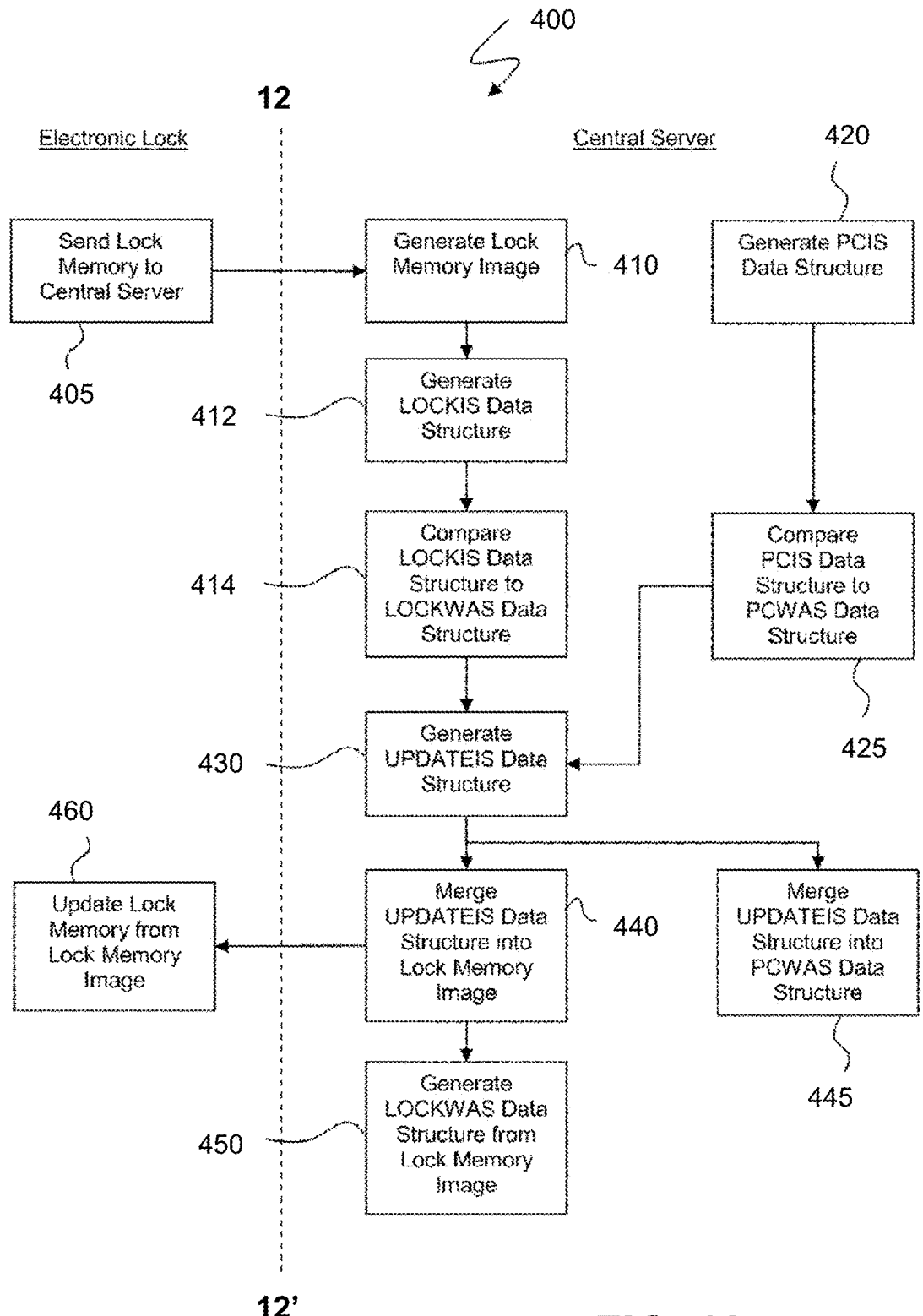
FIG. 12 depicts exemplary steps associated with a method according to another exemplary embodiment of the presently disclosed subject matter.

Another aspect of the presently disclosed subject matter provides for efficient data exchange between the plurality of electronic locks and the central server without having to integrate expensive processing capability into the individual electronic locks. The methodology and apparatus according to such exemplary aspect of certain embodiments of the presently disclosed subject matter shifts the computing horsepower from the small processors and controllers available on an electronic lock to the more significant computing resources available at a central server. With reference to FIGS. 11 and 12, present exemplary methodology and apparatus are discussed in detail.

FIG. 11 depicts a database system according to one exemplary embodiment of the presently disclosed subject matter. More specifically, FIG. 11 depicts an exemplary database structure 300 that may be used in accordance with one disclosed exemplary embodiment to provide four databases that are operably connected to central server 310. Such databases may in some instances be regarded as being inventory reports, at various points in time. Such databases may include LOCKIS 320; LOCKWAS 330; PCIS 340 and PCWAS 340. The LOCKIS database 320 includes data and/or information about the current state of data stored in the memory of the electronic lock. The LOCKWAS database 330 includes data and/or information about the state of data stored in the memory of the electronic lock the last time the electronic lock was connected to the central server 310. The PCIS database 340 contains data and/or information about the current state of data stored at the central server. The PCWAS database 350 contains data and/or information about the state of data stored at the central server the last time the electronic lock was connected to the central server. The electronic access control system uses such exemplary four databases to reconcile the information and/or data stored or provided at the central server with the plurality of electronic locks.

FIG. 12 depicts exemplary steps associated with a method according to another exemplary embodiment of the presently disclosed subject matter. More specifically, FIG. 12 depicts the exemplary steps associated with one exemplary present method 400 of updating a plurality of electronic locks connected to a central server. At step 405, an electronic lock sends information stored in lock memory to the central server. Central server generates a lock memory image from this information as illustrated at step 410 and generates data structure LOCKIS from such lock memory image as illustrated at step 412. Such LOCKIS data structure includes data and/or information about the current state of data stored in the memory of the electronic lock.

At step 414, exemplary present method 400 compares the LOCKIS data structure to the LOCKWAS data structure already stored at the central server. The LOCKWAS data structure includes data and/or information about the state of data stored in the memory of the electronic lock the last time the electronic lock was connected to the central server 310 (FIG. 11). The purpose of such comparison is to see if a supervisor or other user has input updates at the electronic lock since the last update from the central server that are not yet reflected in the central server memory. Present exemplary method 400 compares the LOCKIS data structure to the LOCKWAS data structure to determine any differences. The differences between the LOCKIS data structure and the LOCKWAS data structure are used to generate temporary data structure UPDATEIS as shown at step 430.

At step 420, the central server generates the PCIS data structure. The PCIS data structure contains data and/or information about the current state of data stored at the central server. For example, the PCIS data structure includes update information input into the central server by a supervisor or user. At step 425, the method 400 compares the PCIS data structure to the PCWAS data structure. The PCWAS data structure includes data and/or information about the state of data stored in the memory of the central server the last time the electronic lock was connected to the central server 310 (FIG. 11). The purpose of such comparison is to see if a supervisor or other user has input updates at the central server since the last update from the central server that are not yet reflected in the electronic lock memory. Present exemplary method 400 compares the PCIS data structure to the PCWAS data structure to determine any differences. The differences between the PCIS data structure and the PCWAS data structure are used to generate temporary data structure UPDATEIS as shown at step 430.

UPDATEIS data structure is a temporary data structure created by the central server that includes differences between the PCIS and PCWAS data structures and the LOCKIS and LOCKWAS data structures. At step 440, the central server merges such temporary UPDATEIS data structure into the lock memory image that reflects updates input by a user or supervisor at the central server. At step 445, the central server uses such UPDATEIS data structure to generate a new PCWAS data structure that reflects updates input by a user or supervisor at the electronic lock. Those of ordinary skill in the art will appreciate from the flowcharts herewith that additional features and functionality exist, even though not described herein in detail. For example, in some instances the comparison of differences between the PCIS and PCWAS data structures and the LOCKIS and LOCKWAS data structures will yield different changes (for example, 60 seconds in the former instance, and 30 seconds in the latter instance). In such events, typically there will be an inherently dominate feature which will prevail (such as the PC in the example above).

At step 450, the central server generates a new LOCKWAS data structure. The central server then updates the lock memory from the lock memory image as shown at step 460. As illustrated in FIG. 12, the majority of steps associated with method 400 occur at the central server. The dashed line 12-12' indicates the exemplary present separation of steps that can occur at the central server and the steps that can occur at the electronic lock. As can be seen, the electronic lock is only required to transmit its lock memory to the central server as shown at step 405 and to receive updates to the lock memory as illustrated at step 460. All of the other processing steps associated with method 400 per presently disclosed subject matter may occur at the central server. In such manner, such aspect of certain embodiments of the presently disclosed subject matter shifts computing resources from the electronic lock to the central server. Such allows smaller, less expensive processors and controllers to be used in the electronic locks and preserves power supply resources at the electronic lock. While present embodiments may favor a particular division of labor between the lock's controller and the server, future embodiments may favor a different balance.

Figure 13:
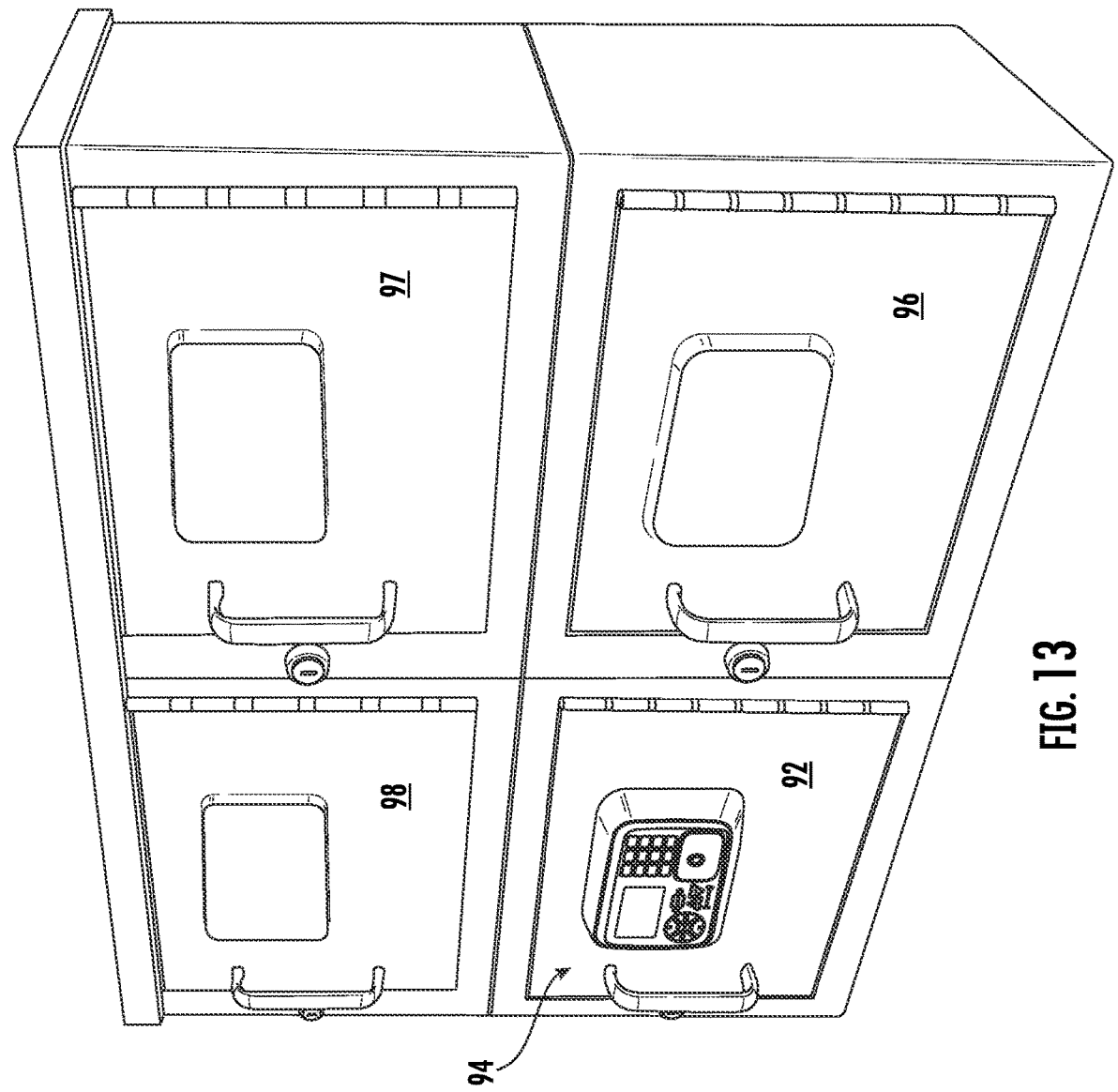
FIG. 13 depicts an image of an exemplary stacked array of plural enclosures in accordance with the presently disclosed subject matter.

FIG. 13 depicts an image of a prototype of an exemplary stacked array of plural enclosures in accordance with the presently disclosed subject matter. For illustrations purposes, enclosure 92 includes a representative electronic lock 94 while enclosures 96, 97, and 98 only include a representative placeholder for installation of a lock.

An installation such as represented by FIG. 13 may illustrate storage of narc boxes such as in the office of a supervisor, prepared to be sent out, or waiting to be prepared to be sent out. As otherwise discussed herein, it is to be understood that any of such enclosures may be identified themselves and/or their content read by the application of RFID technology as discussed herein.

Figure 14:
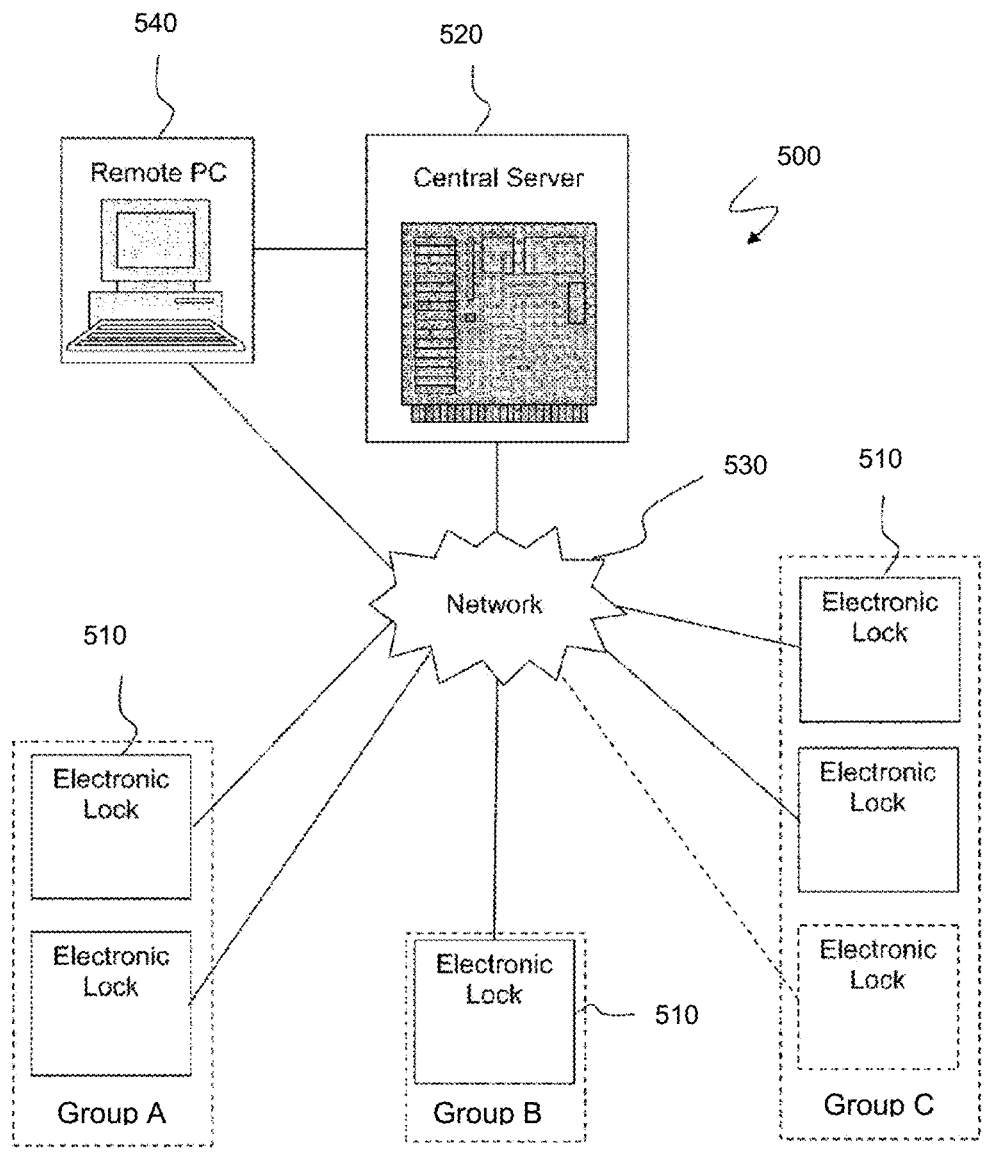
FIG. 14 depicts an exemplary present electronic access control system including a plurality of electronic locks used to secure a plurality of different enclosures or cabinets according to one exemplary embodiment of the presently disclosed subject matter.

With reference to FIG. 14, a block diagram of an exemplary electronic access control system 500 used to secure a plurality of boxes, cases, or enclosures is illustrated. Electronic access control system 500 includes a plurality of electronic locks 510 operatively connected to central server 520 over network 530, or otherwise connected to central server, or to a supervisor's device. Based on the disclosure provided herein, one of ordinary skill in the art will recognize that the inherent flexibility of computer-based systems allows for a great variety of possible configurations, combinations, and/or divisions of tasks and functionality between and among components of the electronic access system 500. For instance, server processes discussed herein may be implemented using a single server or multiple servers working in combination. Those of ordinary skill in the art will appreciate that the various server representations in the drawings herewith are intended to represent both such single or multiple server implementations. Databases and applications may be implemented on a single system or distributed across multiple systems. Distributed components may operate sequentially or in parallel.

In electronic access control system 500, a plurality of electronic locks 510 are used to secure multiple stacks of boxes, including Stack or Group A, Stack or Group B, and Stack or Group C. Each of the groups may have one or more electronic locks, representative of an associated narc box for which an individual electronic lock 510 is required or desired. It is to be understood from the disclosure herewith that the terminology a plurality of securable enclosures may mean a group comprising respective cabinets (or other forms of enclosures), respective drawers, doors, or similar in one or more cabinets, or respective parts or subcomponents of various mixtures of the foregoing. For instance, Group A is illustrated as having two electronic locks 510. Such two electronic locks 510 may be for separate narc boxes or other enclosures in Group A. Similarly, Group C is illustrated as having three electronic locks 510. Such three electronic locks 510 may be for separate narc boxes or other enclosures within Group C. The third electronic lock 510 of Group C is illustrated in dashed line to signify that any number of electronic locks 510 may be associated with a single group.

As discussed above, each of the electronic locks 510 of the electronic access control system 500 uses and creates data that may be managed by the access control system. For example, plural narc boxes all having a particular predetermined profile as to their initial contents, may be readied as a group in Group A, while other content-profiles may be prepared in association with Group B or Group C Access control systems may allow manipulation and control of the access control data at the actual electronic lock 510 itself through, for instance, user interface 160 shown in FIG. 9. In such circumstances, the updating and modification of access control data for each of the individual electronic locks 510 may require a supervisor, service person, or someone of higher position than a "normal" user to go to the lock 510 with a computer such as a laptop computer to perform the data updating and manipulation. Such method requires someone to visit each electronic lock 510 that needs to be updated. If there are hundreds of locks that need to be maintained, such process can be quite time consuming and expensive.

As shown in FIG. 14, the plurality of electronic locks 510 may be connected to a central server 520 over a network 530, per the presently disclosed subject matter. In this manner, updates and other data manipulation and control can occur at the central server 520 and be communicated to each of the plurality of electronic locks 510 over network 530. Data can be managed at the central server 520 or via a remote computing device 540 operatively connected to central server 520.

Network 530 may be any hardwired or wireless network or combinations thereof for connecting the plurality of electronic locks 510 to central server 520. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

In one embodiment, the plurality of electronic locks 510 are connected to central server 520 through a 802.11 WiFi network interface. Enabling wireless communication over an 802.11 WiFi network has many advantages, including, for example, facilitating the exchange of data between a central server and an electronic lock that is used to secure a mobile cabinet or enclosure that would be difficult to connect to a hard wired network.

Electronic locks 510 may interface with network 530, for example, through communications module 170 shown in FIG. 9. Unfortunately, current WiFi wireless network technology does not lend itself to long term battery operation (such as multiple months, or a year, or more). Communications modules adapted to communicate with 802.11 WiFi wireless networks have significant power requirements. Battery packs or other power source modules powering such communication modules often need to be recharged frequently, sometimes daily, to provide continuous power to the communication modules. Charging of battery packs or other power modules on electronic locks, however, is a commercially unfeasible option.

Existing communication modules for communication over 802.11 WiFi networks include a "sleep mode" during which the communication module draws less power from the power source to preserve power supply resources. The communication module, while in "sleep mode" listens for a wake up signal communicated over the WiFi network. The communications module wakes up and returns to full power upon hearing of the wake up signal. After data has been communicated over the network, the communication module may return to a "sleep mode" to preserve power supply resources. Such "sleep mode" feature as currently available is still generally commercially undesirable for electronic lock systems because the communications module, while in "sleep mode," still draws significant power from the power supply source. Therefore, while sleep modes may be helpful under some present or future circumstances, a design which does not require them essentially has more present versatility.

One aspect of the presently disclosed subject matter preserves power supply resources while enabling communication over an 802.11 WiFi network. According to such aspect of the presently disclosed subject matter, an electronic lock includes a controller that is capable of completely powering off a communication module for enabling communications over an 802.11 WiFi network. For instance, as shown in FIG. 9, controller 120 may be adapted to completely power off the communications module 170. By completely powering off the 802.11 WiFi communications module, significant power supply resources can be preserved or conserved.

Once the 802.11 WiFi communications module has been powered off, it can no longer listen for a wake-up signal which triggers the communications module to power back on and to receive and transmit data over the network. To address such issue, one aspect of the presently disclosed subject matter for particular embodiments includes programming the electronic lock to periodically power on the 802.11 WiFi communications module at predetermined time intervals to enable communication over the network. For instance, the electronic lock may be programmed to power on the communications module once a day, once a week, once a month, or after any other time interval. In addition, the electronic lock may include a manual button or other interface that enables a user to manually power on the communications module. After the communications module has been powered on, the electronic lock can receive and transmit data over the network until the communications module powers back down.

One example of specifications for a representative embodiment is set forth in the following Table 2. Such Table 2 incorporates a variety of scenarios which may be encountered, to show how operation of a particular embodiment of presently disclosed subject matter may be conducted. Such operational features are not specifically limited to a given presently disclosed embodiment. In other words, such operative features may be utilized in various embodiments of the presently disclosed technology, with all such embodiments commonly making comparative tracking assessments, so that a tag no longer seen, or a tag seen at an RSSI level below a determined threshold, or a tag seen with a tamper evident indication, all result in detection that a corresponding protected/enclosed dosage was accessed. An exemplary listing of such drugs/dosages is included in the Table 2 subject matter disclosure herewith.

TABLE 2

RFID box example specifications

Definitions

RFID BOX- A narc box assembly loaded with an RFID reader typically on an ambulance
CURRENT INVENTORY- This is a list of DRUG TAGs lastprocessed into the RFID BOX
LAST READ- The list of DRUG TAGs in the RFID box the last time the contents were read
DRUG TAG- An RFID tag on a drug
MISSING DRUG TAGS- Any DRUG TAGs that are not in the LAST READ but are in the CURRENT INVENTORY
NEW DRUG TAGS- Any DRUG TAGS that are in the LAST READ but are not in the CURENT INVENTORY
LIMBO TAGS- Any MISSING DRUG TAGs that do not have information entered into the system regarding their whereabouts
USER- person accessing the RFID box
FULL REMOVE- when all of DRUG TAGs are removed from the RFID BOX
FULL ADD- when DRUG TAGs are added to and empty RFID BOX
PARTIAL REMOVE- when one or more DRUG TAGS (but not all of them) are removed from the RFID box
PARTIAL ADD- when DRUG TAGS are added to the RFID BOX.
INCIDENT- A system that allows tracking of administered DRUG TAGS. This system will track an INCIDENT NUMBER from a third party software (which might include - Image Trend, Water, or Siencia). If the INCIDENT system is turned on- LockView will present an INCIDENT VIEWER which will track the following as part of the INCIDENT NUMBER- USER, DRUG TAG(s), date/time, RFID BOX
INQUIRY- When the LAST READ shows a MISSING DRUG TAG-- the RFID BOX has the ability to inquire with the USER the whereabouts of the MISSING DRUG TAG. The system will be programmable to provide options regarding the whereabouts of the MISSING DRUG TAG. Programmable choices are consumed, expired, broken, and lost. If the INCIDENT system is turned on, the choices are incident, TABLE 2-continued RFID box example specifications expired, broken, and lost. The LockView operator will choose (in the Lock Editor) if the INCIDENT system is turned on and which available options the USER has when there is a MISSING DRUG TAG. If all options are chosen- the user will have the following choices upon the RFID BOX finding a MISSING DRUG TAG:

If the INCIDENT system is turned ON and it is a FULL ADD the following options will be presented to the USER:
        Beginning of shift, INCIDENT NUMBER, Expired, Broken, Lost
    If the INCIDENT system is turned ON and it is NOT a FULL ADD the following options will be presented to the USER:
        INCIDENT NUMBER, Expired, Broken, Lost
    If the INCIDENT system is NOT turned ON and it is a FULL ADD the following options will be presented to the USER:
        Beginning of shift, Consumed Expired, Broken, Lost
    If the INCIDENT system is NOT turned ON and it is NOT a FULL ADD the following options will be presented to the USER:
        Consumed, Expired, Broken, Lost BEGINNING OF SHIFT- The state where the user wants the LAST READ to replace the CURRENT INVENTORY without regard for MISSING DRUG TAGS RFID Tag Editor in LockView-
Major Buttons ADD DRUG TAG
    EDIT DRUG TAG
    SHOW DRUG TAGS
        DRUG TAG SEARCH (when you hit this, you can filter the list of tags by all attributes)
        DRUG TAG TYPE- search by active, inactive or ALL tags
        EXPIRED TAGS- show only DRUG TAGs that have expired drugs
        LIMBO TAGS- show only MISSING DRUG TAGs that do not have proper/complete removal info or incident report info Side Buttons DRUG TAG AUDIT TRAIL-
        The DRUG TAG audit trail will consist of date added along with all of the information regarding the event that caused the DRUG TAG to become consumed: USER, RFID BOX, INCIDENT NUMBER (if INCIDENT system is enabled) and details
    VIEW INCIDENT EDITOR for selected tag

TAG ATTRIBUTES

1. Tag #
2. Drug
    1. Fentanyl
    2. Midazolam (Versed)
    3. Morphine
    4. Hydromorphone (Dilaudid)
    5. Ketamine (Ketalar)
    6. Meperidine (Demerol)
    7. Diazepam (Valium)
    8. Lorazepam (Ativan)
    9. Generic - Special items that may be carried by various departments - Manual entry of info.
3. Type of container (single dose vial, ampule, preloaded syringe) and dosage
4. Drug manufacturer
5. Lot
6. Expiration
7. Date added
8. Date Used
9. How removed-- Incident, expired, broken, lost
10. Incident number (if system is turned on)
11. User who used it (potentially a dual user)
12-16 Extra-for future designations Incident Viewer
Major Buttons ADD Incident (used for LIMBO TAGS only)
    ADD Details to incident
    INCIDENT SEARCH (when you hit this, you can filter the list of incidents by all features)
    Incidents will have the following fields.
        Number
        Date/Time
        User who entered the info
        DRUG TAGS and RFID box involved
        General information
    Able to sort by
        DRUG TAGS
        Date/Time
        USER
        INCIDENT number

TABLE 2-continued

RFID box example specifications

DRUG TYPE
RFID BOX

RFID Box operations

The list of fully processed DRUG TAGS in the RFID BOX is called the CURRENT INVENTORY. The contents of the RFID box are read every time after the door is closed- this is called the LAST READ. The CURRENT INVENTORY is then comparted to the LAST READ. The results of this comparison will present seven possible sceneriaos:
1. FULL REMOVE- The CURRENT INVENTORY has 2 or more DRUG TAGS. After the LAST READ ALL DRUG TAGS are now missing, which means that the contents of the RFID box are empty.
2. FULL ADD- After a FULL REMOVE, when one or more DRUG TAGS are added.
3. PARTIAL REMOVE- The CURRENT INVENTORY has 2 or more DRUG TAGS. After the LAST READ there are one or more DRUG TAGS still remaining as well as MISSING DRUG TAGS.
4. PARTIAL ADD- The CURRENT INVENTORY has 1 or more DRUG TAGS. After the LAST READ there are NEW DRUG TAGS found and no MISSING DRUG TAGS
5. FULL REMOVE ONE ITEM - The CURRENT INVENTORY has 1 DRUG TAG. After the LAST READ there is one MISSING DRUG TAG, which means that the contents of the RFID box are empty.
6. COMBINATION PARTIAL REMOVE/ADD- The CURRENT INVENTORY has 1 or more DRUG TAGS. After the LAST READ there are one or more DRUG TAGS found. These DRUG TAGS are a combination of DRUG TAGS found in the CURRENT INVENTORY, MISSING DRUG TAGS and NEW DRUG TAGS.
7. NO ACTION- When the CURRENT INVENTORY and the LAST READ are identical. This means that the USER accessed the RFID box and added/removed no DRUG TAGS.

The following will occur after the different types of reads:
1. FULL REMOVE- The CURRENT INVENTORY has 2 or more DRUG TAGS. The LAST READ is comparted to the CURRENT INVENTORY and the all DRUG TAGs are removed. Nothing happens with the memory or the display.
2. FULL ADD- (only occurs after a FULL REMOVE) The LAST READ is comparted to the CURRENT INVENTORY and the DRUG TAGS have returned. Any NEW DRUG TAGS are added to the CURRENT INVENTORY. If any NEW DRUG TAGs are currently LIMBO TAGs, they will be removed from the LIMBO tag list. If there are MISSING DRUG TAGS, The USER will be asked an INQUIRY regarding each MISSING DRUG TAG. If beginning of shift is chosen, the CURRENT INVENTORY will be replaced by the LAST READ and the INQUIRY will end. If beginning of shift is not chosen- The USER will be asked an INQUIRY regarding each MISSING DRUG TAG. The user will be asked regarding the drug type corresponding to the prefix of the MISSING DRUG TAG. Once the USER responds to the INQUIRY, the MISSING DRUG TAG will be removed from the CURRENT INVENTORY. If the USER does not respond to the INQUIRY, the tag will become a LIMBO TAG.
3. PARTIAL REMOVE- The CURRENT INVENTORY has 2 or more DRUG TAGS. The LAST READ is comparted to the CURRENT INVENTORY and there are one or more DRUG TAGS as well as MISSING DRUG TAGS. The USER will be asked an INQUIRY regarding each MISSING DRUG TAG. The user will be asked regarding the drug type corresponding to the prefix of the MISSING DRUG TAG. Once the USER responds to the INQUIRY, the MISSING DRUG TAG will be removed from the CURRENT INVENTORY. If the USER does not respond to the INQUIRY, the tag will become a LIMBO TAG.
4. PARTIAL ADD- The LAST READ is comparted to the CURRENT INVENTORY. Any NEW DRUG TAGS are added to the CURRENT INVENTORY. If any NEW DRUG TAGs are currently LIMBO TAGs, they will be removed from the LIMBO tag list.
5. FULL REMOVE ONE ITEM- The CURRENT INVENTORY has 1 DRUG TAG. The LAST READ is comparted to the CURRENT INVENTORY and there now is one MISSING DRUG TAG. The USER will be asked an INQUIRY regarding the MISSING DRUG TAG. The user will be asked regarding the drug type corresponding to the prefix of the MISSING DRUG TAG. Once the USER responds to the INQUIRY, the MISSING DRUG TAG will be removed from the CURRENT INVENTORY. If the USER does not respond to the INQUIRY, the tag will become a LIMBO TAG.
6. COMBINATION PARTIAL REMOVE/ADD- The CURRENT INVENTORY has 1 or more DRUG TAGS. After the LAST READ there are one or more DRUG TAGS found. These DRUG TAGS are a combination of DRUG TAGS found in the CURRENT INVENTORY, MISSING DRUG TAGS and NEW DRUG TAGS. NEW drug tags will be processed according to the rules of PARTIAL ADD. MISSING TAGS will be processed according to the rules of PARTIAL REMOVE.
7. NO ACTION- When the CURRENT INVENTORY and the LAST READ are identical. This means that the USER accessed the RFID box and added/removed DRUG TAGS.

General Tag info

All tags will be unique and can be loaded into the system one of 2 ways. First, the tag can be manually scanned and added into the TAG editor. Secondly, it can be automatically added into the system buy appearing in an INITIAL LOAD or STANDARD MODE RFID read. If the tag is entered automatically, this tag will be automatically entered into the RFID tag editor. The operator will be able to edit this tag and enter additional information later. The prefix of the tag ID will determine the drug type.
The audit trail should not show that LIMBO TAGs are removed until the end/beginning of shift. There is a possibility that the tag will be returned before the end/beginning of shift. Once the beginning of shift has occurred, the list of LIMBO TAGS is emptied and the last user to not have the tag will be noted in the audit trail.

Variations may be practiced in different embodiments of presently disclosed subject matter. For example, as noted per the operational example of Table 2 herewith, an "incident" system or feature may be included. Such a feature, when included in a given embodiment, will allow a report to be generated regarding all of the particulars regarding a given incident, regardless of whether the overall system is turned on or off, per the included specifications of Table 2. Such particulars may include, for example, associated incident date and EMS crew data (when the embodiment involves an EMS crew).

Another alternative feature which may be practiced in some embodiments is to provide the enclosure or storage box with internal walls which are not perfectly parallel. By being intentionally off-parallel, the RF waves do not compound in a way that can otherwise produce "ringing," which results in better performance for locating or tracking/detecting tags within the case.

Further, embodiments may be practiced for which scanning for contents present is only conducted whenever the system detects that the door is closed. For example, door switch 44 may be monitored to ensure the door is closed prior to any inventory tracking step. Using such methodology helps to ensure that there are no misreads due to any stray RFID tags which may be in the area but not in the case.

While the presently disclosed subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the presently disclosed subject matter as would be readily apparent to one of ordinary skill in the art.

What is claimed is:

1. A system for combined electronic inventory data and access control on a mobile EMS vehicle, comprising:
   a closable enclosure receivable on a mobile EMS vehicle;
   a plurality of respective RFID tags with a respective frangible component and associated with respective consumable inventory items to be received in said enclosure, said RFID tags having an altered ID characteristic readable by an RFID reader once said frangible component thereof is ruptured for access to their respective consumable inventory items as used during the course of the mobile EMS vehicle operations;
   an electronically actuated lock system for selectively allowing locking and unlocking of said enclosure by authorized EMS personnel;
   an RFID reading system, associated with said enclosure, and adapted for determining at a selected time both unruptured RFID tags and RFID tags having altered ID characteristics received within said enclosure when closed, so as to identify any remaining corresponding respective consumable inventory items associated therewith; and
   a removable case receivable in said enclosure and having an associated non-frangible RFID tag for tracking of whether said removable case is received within said enclosure, said removable case further adapted for receiving therein said consumable inventory items and their respective RFID tags with respective frangible components.

2. A system as in claim 1, wherein said frangible component comprises an external loop associated with the body of a respective RFID tag and positioned to be ruptured whenever said respective consumable inventory item thereof is accessed, and said altered ID characteristic thereof is that said ID characteristic includes a flagged tamper bit as readable by an RFID reader whenever said RFID tag external loop is ruptured.

3. A system as in claim 1, wherein said frangible component comprises the body of a respective RFID tag, and said altered ID characteristic thereof is that said ID characteristic as readable by an RFID reader is eliminated whenever said RFID tag frangible body is ruptured.

4. A system as in claim 1, wherein said frangible component comprises the body of a respective RFID tag, and said altered ID characteristic thereof is that said ID characteristic has relatively reduced signal strength as readable by an RFID reader whenever said RFID tag frangible body is at least partially ruptured.

5. A system as in claim 1, wherein said closable enclosure is lockable in a closed position thereof.

6. A system as in claim 1, wherein said RFID reading system determines inventory of said enclosure at a plurality of times.

7. A system as in claim 6, wherein said plurality of times includes at least one determination later in time than another determination to establish inventory changes in said enclosure during the interim between such two determinations.

8. A system as in claim 7, wherein said inventory changes comprise inventory either of removed from or added to said enclosure.

9. A system as in claim 8, wherein said electronically actuated lock system is further adapted for maintaining an audit trail for actuation of said electronically actuated lock system and associating said audit trail with removed inventory to track chain of custody for such removed inventory.

10. A system as in claim 9, further including an integrated inventory control system in communication with said electronically actuated lock system.

11. A system as in claim 10, wherein said integrated inventory control system is further adapted for providing visual readouts of audit reports for determining what inventory has been removed from or added to an enclosure and what inventory remains within said enclosure.

12. A system as in claim 11, wherein said audit reports include incident reports associated with particular inventory.

13. A system as in claim 10, further including a central server communicating over an 802.11 WiFi wireless network for providing communications between said integrated inventory control system and said electronically actuated lock system.

14. A system as in claim 13, further including a plurality of said closable enclosures, each having a respective electronically actuated lock system, and wherein said integrated inventory control system is in communication with each of said closable enclosures via its respective electronically actuated lock system.

15. A system as in claim 1, wherein said RFID reading system is further adapted for determining whether said removable case with its associated non-frangible RFID tag is received within said enclosure when closed.

16. A system as in claim 1, wherein said plurality of respective RFID tags with respective frangible components are associated with respective consumable inventory items comprising controlled drugs for use on a mobile EMS vehicle.

17. A system as in claim 16, wherein said RFID tags with respective frangible components are respectively preprogramed for corresponding to a particular drug to be stocked in said enclosure.

18. A system as in claim 17, wherein said RFID tags with respective frangible components are associated with respective visual markings to be read by a human user.

19. A system as in claim 18, further including respective color codings to be read by a human user for identifying particular drugs stocked in said enclosure.

20. A system as in claim 1, wherein said closable enclosure includes a lockable door.

21. A system as in claim 20, further including paired sensors operatively associated with said door and said electronically actuated lock system for detection of whether said door is open or closed, and an external power cable for providing external power to said electronically actuated lock system.

22. A system as in claim 1, wherein:
said closable enclosure includes a reinforced housing with a lockable door; and
said electronically actuated lock system includes an electronically movable latch and electronic access control circuit mounted within said reinforced housing, a user interface display and control panel mounted on the outside of said reinforced housing for controlling said movable latch into either of a locked or unlocked position thereof, and a corresponding stop member for preventing said enclosure door from being opened whenever said movable latch is in said locked position thereof.

23. A system as in claim 22, wherein said electronically movable latch includes one of a motorized latch, a solenoid, and an electronic prime mover.

24. A system as in claim 23, wherein said system further includes:
mounting door hinges for mounting of said door relative to said enclosure;
an exterior handle on said enclosure; and
a separate mechanical key override lock for said enclosure.

25. A system as in claim 23, wherein said enclosure defines small openings for mounting of said enclosure and for the passage of wiring between the interior and exterior of said enclosure.

26. A system as in claim 23, wherein said enclosure is between 10 and 20 inches wide, between 6 and 15 inches tall, and between 6 and 12 inches deep.

27. A system as in claim 1, wherein said electronically actuated lock system includes a credential reader, a microprocessor based control circuit, and an electronic lock to allow access to said enclosure whenever acceptable credentials are presented to said credential reader.

28. A system as in claim 27, wherein said credential reader includes at least one of keypads, magnetic stripe card readers, proximity card readers, "ibuttons," smart card readers, bar code card readers, and biometric readers.

29. A system as in claim 27, wherein said microprocessor based control circuit maintains a log of activities of said electronic lock for providing access to said enclosure.

30. A system as in claim 29, wherein said log includes at least one of user name, credential type and ID, supervisor level, and valid access times.

31. A system as in claim 29, wherein:
said system further includes a temperature sensor associated with said enclosure; and
said microprocessor based control circuit maintains temperature limit settings for stored inventory, and monitors the output of said temperature sensor to set off an alarm if monitored temperatures are outside of limit settings.

32. A system as in claim 29, wherein said system further includes an environmental sensor for monitoring of at least one of temperature, humidity, and vibrations.

33. A system as in claim 1, wherein said RFID reading system associated with said enclosure further includes a limited profile RFID antenna within said enclosure.

34. A system as in claim 33, wherein said RFID antenna comprises one of a UHF RFID antenna and an HF RFID antenna.

35. A system as in claim 1, wherein said lockable enclosure includes an RFID antenna within said enclosure, and includes electromagnetic shielding so to block any external electromagnetic fields, so that any RFID readings are limited to operative RFID tags and their associated contents which are within said enclosure when said door is closed.

36. A system as in claim 1, further including a power source for powering said electronically actuated lock system and said RFID reading system.

37. Apparatus for combined current inventory data management and access control on a mobile EMS vehicle, comprising:
a lockable enclosure receivable on a mobile EMS vehicle, said enclosure including a door which can be opened and closed under electronic lock control by authorized EMS personnel;
an electronically actuated lock system for selectively allowing locking and unlocking of said enclosure by respective closing and opening of said door;
an RFID reading system associated with said lockable enclosure including an RFID antenna within said enclosure for determining the identity of respective enclosure contents having respective frangible RFID tags within said enclosure, which tags produce altered ID characteristics interoperative with said RFID reading system when ruptured for access to their associated contents as used during the course of the mobile EMS vehicle operations; and
a removable case receivable in said enclosure and having an associated non-frangible RFID tag for tracking of whether said removable case is received within said enclosure, said removable case further adapted for receiving therein said respective enclosure contents having respective frangible RFID tags;
wherein said lockable enclosure includes electromagnetic shielding so to block any external electromagnetic fields, so that any RFID readings are limited to both RFID tags and their remaining associated contents and RFID tags with altered ID characteristics which are within said enclosure when said door is closed.

38. Apparatus as in claim 37, wherein each of said respective frangible RFID tags includes an external loop associated with the body thereof and positioned to be ruptured whenever said respective enclosure contents identified therewith are accessed, and said altered ID characteristic thereof is that said ID characteristic includes a flagged tamper bit as readable by said RFID reading system whenever said frangible RFID tag external loop is ruptured.

39. Apparatus as in claim 37, wherein each of said respective frangible RFID tags includes a frangible body which is ruptured whenever said respective enclosure contents identified therewith are accessed, and said altered ID characteristic thereof is that said ID characteristic as readable by said RFID reading system is eliminated whenever said RFID tag frangible body is ruptured.

40. Apparatus as in claim 37, wherein each of said respective frangible RFID tags includes a frangible body which is at least partially ruptured whenever said respective enclosure contents identified therewith are accessed, and said altered ID characteristic thereof is that said ID characteristic has a relatively reduced signal strength as readable by said RFID reading system whenever said RFID tag frangible body is at least partially ruptured.

41. Apparatus as in claim 37, wherein:
said contents comprise medicinal dosages of controlled substances for use in association with an EMS vehicle; and
said frangible RFID tags are adapted to be at least partially ruptured for altered RFID reading thereof whenever a respective medicinal dosage is acquired for administration.

42. Apparatus as in claim 41, wherein said RFID reading system is adapted for reading contents of said enclosure at respective start and stop times of a work shift, for tracking the use of said contents during said work shift.

43. Apparatus as in claim 42, further including a removable case with associated RFID tag for being selectively stored within said enclosure, and for removably holding said enclosure contents in said case, whereby users may temporarily remove all available contents from said enclosure by removal of said case from said enclosure, with tracking of said case by said RFID reading system.

44. Methodology for combined electronic inventory data and access control on a mobile EMS vehicle, comprising:
providing a closable enclosure, receivable on a mobile EMS vehicle, with an electronically actuated lock system for selectively allowing locking and unlocking of said enclosure by authorized EMS personnel;
providing a plurality of respective frangible RFID tags associated with respective consumable inventory items to be received in said enclosure, said RFID tags producing altered ID characteristics interoperative with an RFID reading system once at least partially ruptured for access to their respective consumable inventory items as used during the course of the mobile EMS vehicle operations;
associating an RFID reading system with said enclosure and with an RFID antenna within said enclosure;
determining with said RFID reading system at a selected time both unruptured frangible RFID tags and RFID tags with altered ID characteristics received within said enclosure when closed, so as to identify remaining corresponding respective consumable inventory items associated therewith; and
providing a removable case receivable in said enclosure and having an associated non-frangible RFID tag for tracking of whether said removable case is received within said enclosure, said removable case further adapted for receiving therein said consumable inventory items and their respective frangible RFID tags.

45. Methodology as in claim 44, wherein each of said respective frangible RFID tags includes a respective frangible component thereof.

46. Methodology as in claim 45, wherein each of said respective frangible components of said respective RFID tags comprises at least one of:
(1) an external loop associated with the body thereof and positioned to be ruptured whenever said respective consumable inventory items associated therewith are accessed, and said altered ID characteristic thereof is that said ID characteristic includes a flagged tamper bit as readable by said RFID reading system whenever said frangible RFID tag external loop is ruptured;
(2) a frangible body which is ruptured whenever said respective consumable inventory items associated therewith are accessed, and said altered ID characteristic thereof is that said ID characteristic as readable by said RFID reading system is eliminated whenever said RFID tag frangible body is ruptured; and
(3) a frangible body which is at least partially ruptured whenever said respective consumable inventory items associated therewith are accessed, and said altered ID characteristic thereof is that said ID characteristic has relatively reduced signal strength as readable by said RFID reading system whenever said RFID tag frangible body is at least partially ruptured.

47. Methodology as in claim 44, further including determining at a plurality of times inventory of said enclosure using said RFID reading system.

48. Methodology as in claim 47, wherein said plurality of times includes at least one determination later in time than another determination to establish inventory changes in said enclosure during the interim between such two determinations.

49. Methodology as in claim 48, wherein inventory changes comprise inventory either of removed from or added to said enclosure.

50. Methodology as in claim 48, wherein said electronically actuated lock system is further adapted for maintaining an audit trail for actuation of said electronically actuated lock system and associating said audit trail with removed inventory to track chain of custody for such removed inventory.

51. Methodology as in claim 50, wherein said audit trail includes incident reports associated with particular inventory.

52. Methodology as in claim 44, wherein said RFID reading system is further adapted for determining whether said removable case with its associated non-frangible RFID tag is received within said enclosure when closed.

53. Methodology as in claim 44, further including providing said electronically actuated lock system with a credential reader, a microprocessor based control circuit, and an electronic lock to allow access to said enclosure whenever acceptable credentials are presented to said credential reader.

54. Methodology as in claim 53, wherein said microprocessor based control circuit maintains a log of activities of said electronic lock for providing access to said enclosure.

55. Methodology as in claim 44, further including:
providing said lockable enclosure with electromagnetic shielding so to block any external electromagnetic fields, so that any RFID readings are limited to RFID tags and their associated contents which are within said enclosure when said door is closed.

56. Methodology as in claim 44, further including associating respective color codings with said respective consumable inventory items to be read by a human user for identifying particular inventory items stocked in said enclosure.

57. A system for combined electronic inventory data and access control on a mobile EMS vehicle, comprising:
a closable enclosure receivable on a mobile EMS vehicle;
a plurality of respective frangible RFID tags associated with respective consumable inventory items to be received in said enclosure comprising controlled drugs for use on a mobile EMS vehicle, and wherein said RFID tags are adapted to at least partially rupture to produce altered ID characteristics for RFID reading whenever the contained drugs are acquired for administration as used during the course of the mobile EMS vehicle operations;

an electronically actuated lock system for selectively allowing locking and unlocking of said enclosure by authorized EMS personnel;

an RFID reading system, associated with said enclosure, and adapted for determining at a selected time unruptured frangible RFID tags received within said enclosure when closed, so as to identify remaining corresponding respective consumable inventory items associated therewith; and a removable narcotics case with associated non-frangible RFID tag for being selectively stored within said enclosure, and for removably holding said consumable inventory items in said case, whereby users may temporarily remove all available contents from said enclosure by removal of said case from said enclosure, with tracking of said case by said RFID reading system so that a record of custody of control is maintained throughout an EMS vehicle crew work shift.

58. A system as in claim 57, wherein said RFID reading system is adapted for reading contents of said enclosure at respective start and stop times of an EMS vehicle crew work shift, for tracking the use of said contents during said work shift.

59. A system as in claim 57, wherein said record of custody includes incident reports associated with particular inventory items.

60. A system as in claim 57, further including respective color codings to be read by a user for identifying particular drugs stocked as said respective consumable inventory items.

61. A system as in claim 57, further including memory for storing tracking data regarding corresponding respective consumable inventory items identified with said RFID reading system.

62. A system as in claim 61, wherein said tracking data includes identification of each specific drug and its dosage level.

63. A system as in claim 61, further including an integrated inventory control system in communication with said electronically actuated lock system and said memory, for periodically accessing tracking data therefrom.

64. A system as in claim 63, wherein said integrated inventory control system is adapted for communicating with said electronically actuated lock system and said memory, via one of an 802.11 WiFi wireless network, Ethernet, and a non-network based arrangement.

65. A system as in claim 57, wherein said closable enclosure comprises welded heavy gauge steel.

66. A system as in claim 57, wherein said closable enclosure further includes a built-in converter for dedicated power for use connected with the electrical power supply on an EMS vehicle.

67. A system as in claim 57, wherein said closable enclosure further includes an auto-relocking door feature and a mechanical key override.

68. A system as in claim 57, wherein each of said respective frangible RFID tags includes an external loop associated with the body thereof and positioned to be ruptured whenever said respective consumable inventory items associated therewith are acquired for administration, and said altered ID characteristic thereof is that said ID characteristic includes a flagged tamper bit as readable by said RFID reading system whenever said frangible RFID tag external loop is ruptured.

69. A system as in claim 57, wherein each of said respective frangible RFID tags includes a frangible body which is ruptured whenever said respective consumable inventory items associated therewith are acquired for administration, and said altered ID characteristic thereof is that said ID characteristic as readable by said RFID reading system is eliminated whenever said RFID tag frangible body is ruptured.

70. A system as in claim 57, wherein each of said respective frangible RFID tags includes a frangible body which is at least partially ruptured whenever said respective consumable inventory items associated therewith are acquired for administration, and said altered ID characteristic thereof is that said ID characteristic has a relatively reduced signal strength as readable by said RFID reading system whenever said RFID tag frangible body is at least partially ruptured.

71. Methodology for providing combined electronic inventory data and access control for controlled drugs for use on a mobile EMS vehicle, comprising:

providing a closable enclosure, receivable on a mobile EMS vehicle, having an electronically actuated lock system for selectively allowing locking and unlocking of said enclosure by an authorized user;

associating an RFID reading system with said enclosure;

associating a plurality of respective frangible RFID tags with respective consumable inventory items to be received in said enclosure comprising controlled drugs for use on a mobile EMS vehicle, with said RFID tags adapted to at least partially rupture to produce altered ID characteristics for RFID reading whenever the contained drugs are acquired for administration;

using said RFID reading system to determine at selected times unruptured frangible RFID tags received within said enclosure when closed, so as to identify corresponding respective consumable inventory items associated therewith;

storing in a memory tracking data corresponding to the identification data determined by said RFID reading system;

providing a removable narcotics case and selectively storing said case within said enclosure; and storing said consumable inventory items in said case, whereby users may temporarily remove all available contents from said enclosure by removal of said case from said enclosure, with tracking by said RFID reading system so that a record of custody of control is maintained throughout an EMS vehicle crew work shift, wherein said closable enclosure comprises heavy gauge metal, and includes a built-in converter for dedicated power for use connected with the electrical power supply on an EMS vehicle, and said closable enclosure further includes a mechanical key override.

72. Methodology as in claim 71, further including determining contents of said enclosure at respective start and stop times of an EMS vehicle crew work shift, for tracking the use of said contents during said work shift.

73. Methodology as in claim 71, wherein said record of custody includes incident reports associated with particular inventory items, including associated incident date and EMS vehicle crew data.

74. Methodology as in claim 71, further including preloading of said removable narcotics case by a supervisor with an initial set of consumable inventory items in said case to be carried onto an EMS vehicle for possible use during the course of a shift.

75. Methodology as in claim 74, further including:
providing said removable narcotics case with an associated non-frangible RFID tag;
using RFID scanning to identify a narcotics case after it has been preloaded by a supervisor for start of a shift; and
when returned at the end of a shift, using RFID scanning to identify such narcotics case and for a supervisor to determine its contents.

76. Methodology as in claim 71, further including storing in said tracking data identification of each specific drug and its dosage level.

77. Methodology as in claim 71, further including associating respective color codings with respective consumable inventory items to be read by a user for identifying particular drugs.

78. Methodology as in claim 71, further including selectively communicating with said memory using a centralized integrated inventory control system.

79. Methodology as in claim 78, further including selectively communicating with said memory via one of an 802.11 WiFi wireless network, Ethernet, and a non-network based arrangement.

80. Methodology as in claim 71, wherein said closable enclosure heavy gauge metal comprises welded heavy gauge steel, said closable enclosure further includes an auto-relocking door feature, and said methodology includes providing said removable narcotics case with an associated non-frangible RFID tag.

81. Methodology as in claim 71, further including:
providing said removable narcotics case with an associated non-frangible RFID tag; and
wherein said tracking data is maintained throughout a work shift so as to establish a complete record of custody of a narcotics case from start-of-shift removal from a central station, to throughout the work day, to return to station.

82. Methodology as in claim 71, further including tracking the location of the EMS vehicle carrying said narcotics case and the associated EMS personnel.

83. Methodology as in claim 71, further including providing said removable narcotics case with an associated non-frangible RFID tag, and providing a plurality of enclosures with electronic locks in a supervisory storage area, for a supervisor to preload and RFID scan a respective plurality of narcotics boxes prepared to be sent out.

84. Methodology as in claim 71, wherein each of said respective frangible RFID tags includes an external loop associated with the body thereof and positioned to be ruptured whenever said respective consumable inventory items associated therewith are acquired for administration, and said altered ID characteristic thereof is that said ID characteristic includes a flagged tamper bit as readable by said RFID reading system whenever said frangible RFID tag external loop is ruptured.

85. Methodology as in claim 71, wherein each of said respective frangible RFID tags includes a frangible body which is ruptured whenever said respective consumable inventory items associated therewith are acquired for administration, and said altered ID characteristic thereof is that said ID characteristic as readable by said RFID reading system is eliminated whenever said RFID tag frangible body is ruptured.

86. Methodology as in claim 71, wherein each of said respective frangible RFID tags includes a frangible body which is at least partially ruptured whenever said respective consumable inventory items associated therewith are acquired for administration, and said altered ID characteristic thereof is that said ID characteristic has a relatively reduced signal strength as readable by said RFID reading system whenever said RFID tag frangible body is at least partially ruptured.

87. An electronic access control system for inventory data and access control for electronically controlled lock systems for mobile EMS vehicles, comprising:
a communications network;
a plurality of electronic locks, respectively associated with a plurality of securable enclosures respectively associable with respective mobile EMS vehicles, and each of said locks operable for selective locking and unlocking thereof by authorized EMS personnel and having respective network communications devices for respectively connecting said each electronic lock with said communications network; and
a central server, connected with said plurality of electronic locks over said network, and selectively providing at least one of data updates and management for each of said electronic locks;
wherein each of said securable enclosures includes:
a plurality of respective frangible RFID tags associated with respective consumable inventory items to be received in said respective enclosures, with said RFID tags adapted to at least partially rupture to produce altered ID characteristics for RFID reading by an RFID reader once their respective consumable inventory items are accessed as used during the course of the mobile EMS vehicle operations;
a plurality of respective RFID reading systems, associated with each said respective enclosure, and adapted for determining at a selected time unruptured frangible RFID tags received within said enclosure when secured, so as to identify corresponding remaining respective consumable inventory items associated therewith; and
a plurality of removable cases respectively receivable in each of said enclosures and having an associated non-frangible RFID tag for tracking of whether each removable case is received within a respective enclosure, said removable cases further adapted for receiving therein said consumable inventory items and their respective frangible RFID tags.

88. An electronic access control system as in claim 87, wherein:
said network communications devices comprise 802.11 WiFi wireless communications modules; and
said communications network is capable of communicating with 802.11 WiFi wireless communications modules.

89. An electronic access control system as in claim 88, wherein each of said electronic locks includes a power source and a controller for powering on an associated 802.11 WiFi communications module with said power source.

90. An electronic access control system as in claim 89, wherein said controller includes a microprocessor, main memory, random access memory, and input/output features.

91. An electronic access control system as in claim 90, wherein said controller input/output features include a control panel having navigation keys for programming selected operational characteristics of an associated electronic lock.

92. An electronic access control system as in claim 90, wherein:
- said power source comprises a battery; and
- said electronic locks each respectively further include data memory to record associated electronic lock activities and data, an electronic latch, a visual display, and a user interface.

93. An electronic access control system as in claim 92, wherein said associated electronic lock activities and data recorded in said data memory include at least one of user name, credential type and ID, supervisor level, valid access times, lock name, access hardware type, open time, authorized user lists, inventory data, audit trail data, and environmental tracking data.

94. An electronic access control system as in claim 93, wherein a controller of an associated electronic lock is operative to provide access to an associated enclosure through actuation of an associated latch upon presentation of a valid access credential by a user via input/output features of said controller.

95. An electronic access control system as in claim 93, wherein said electronic latch comprises one of a motorized latch, a solenoid, and an electronic prime mover.

96. An electronic access control system as in claim 87, wherein communications between said network and said respective network communications devices include one of hardwired and wireless communications links, or both.

97. An electronic access control system as in claim 87, wherein said central server and each of said plurality of electronic locks each include a database structure, to facilitate efficient data exchange between said central server and said plurality of electronic locks by allowing multiple simultaneous database manipulations via said communications network.

98. An electronic access control system as in claim 97, further comprising a PC in communication with one of said central server and said network, and operable with a database structure for data exchange with said plurality of electronic locks.

99. An electronic access control system as in claim 98, wherein said database structure includes databases LOCKIS, LOCKWAS, PCIS, and PCWAS.

100. An electronic access control system as in claim 98, wherein said PC is operable for allowing a supervisor level user to selectively update said plurality of electronic locks and to selectively track lock data from said plurality of electronic locks.

101. An electronic access control system as in claim 87, wherein said plurality of electronic locks each comprise a main housing associated with an enclosure, an electronic assembly, a battery pack, a communications port, a programming keypad, a display, and a strike assembly and associated latch bolt.

102. An electronic access control system as in claim 87, wherein each of said respective frangible RFID tags includes an external loop associated with the body thereof and positioned to be ruptured whenever said respective consumable inventory items associated therewith are accessed, and said altered ID characteristic thereof is that said ID characteristic includes a flagged tamper bit as readable by an associated RFID reading system whenever said frangible RFID tag external loop is ruptured.

103. An electronic access control system as in claim 87, wherein each of said respective frangible RFID tags includes a frangible body which is ruptured whenever said respective consumable inventory items associated therewith are accessed, and said altered ID characteristic thereof is that said ID characteristic as readable by an associated RFID reading system is eliminated whenever said RFID tag frangible body is ruptured.

104. An electronic access control system as in claim 87, wherein each of said respective frangible RFID tags includes a frangible body which is at least partially ruptured whenever said respective consumable inventory items associated therewith are accessed, and said altered ID characteristic thereof is that said ID characteristic has a relatively reduced signal strength as readable by an associated RFID reading system whenever said RFID tag frangible body is at least partially ruptured.

105. Methodology for an electronic access control system for inventory data and access control for electronically controlled lock systems for mobile EMS vehicles, comprising:
- providing a communications network;
- providing a plurality of electronic locks, each of said locks having respective network communications devices for respectively connecting said each electronic lock with said communications network;
- respectively associating said plurality of locks with a plurality of securable enclosures respectively associable with respective mobile EMS vehicles, with each of said locks operable for selective locking and unlocking of respective enclosures by authorized EMS personnel;
- providing each of said securable enclosures with a plurality of respective frangible RFID tags associated with respective consumable inventory items to be received in said respective enclosures, with said RFID tags adapted to at least partially rupture to produce altered ID characteristics for RFID reading by an RFID reader once their respective consumable inventory items are accessed as used during the course of the mobile EMS vehicle operations;
- providing each of said securable enclosures a plurality of respective RFID reading systems, associated with each said respective enclosure, and adapted for determining at a selected time unruptured frangible RFID tags received within said enclosure when secured, so as to identify corresponding remaining respective consumable inventory items associated therewith;
- using said RFID reading systems, selectively establishing data at said respective enclosures for identifying corresponding remaining respective consumable inventory items associated therewith;
- providing a central server connected with said plurality of electronic locks over said network;
- selectively providing at least one of data updates and data management for each of said electronic locks, conducted by said central server over said network; and
- providing a removable case receivable in each of said enclosures and having an associated non-frangible RFID tag for tracking of whether said removable case is received within said enclosure, said removable case further adapted for receiving therein said remaining consumable inventory items and their respective frangible RFID tags.

106. Methodology as in claim 105, wherein:
said network communications devices comprise 802.11 WiFi wireless communications modules; and
said communications network is capable of communicating with 802.11 WiFi wireless communications modules.

107. Methodology as in claim 106, wherein each of said electronic locks includes a power source and a controller for powering on an associated 802.11 WiFi communications module with said power source.

108. Methodology as in claim 107, wherein said controller includes a microprocessor, main memory, random access memory, and a control panel having navigation keys for programming selected operational characteristics of an associated electronic lock.

109. Methodology as in claim 108, wherein:
said power source comprises a battery; and
said electronic locks each respectively further include an electronic latch, a visual display, a user interface, and data memory to record at least one of user name, credential type and ID, supervisor level, valid access times, lock name, access hardware type, open time, authorized user lists, inventory data, audit trail data, and environmental tracking data.

110. Methodology as in claim 109, wherein a controller of an associated electronic lock is operative to provide access to an associated enclosure through actuation of an associated latch upon presentation of a valid access credential by a user via said control panel of said controller.

111. Methodology as in claim 109, wherein said electronic latch comprises one of a motorized latch, a solenoid, and an electronic prime mover.

112. Methodology as in claim 105, wherein communications between said network and said respective network communications devices include one of hardwired and wireless communications links, or both.

113. Methodology as in claim 105, wherein said central server and each of said plurality of electronic locks each include a database structure with databases LOCKIS, LOCKWAS, PCIS, and PCWAS, to facilitate efficient data exchange between said central server and said plurality of electronic locks by allowing multiple simultaneous database manipulations via said communications network.

114. Methodology as in claim 113, further comprising:
a PC in communication with one of said central server and said network, and operable with a database structure for data exchange with said plurality of electronic locks; and
wherein said PC is operable for allowing a supervisor level user to selectively update said plurality of electronic locks and to selectively track lock data from said plurality of electronic locks.

115. Methodology as in claim 105, wherein each of said respective frangible RFID tags includes a respective frangible component thereof.

116. Methodology as in claim 115, wherein each of said respective frangible components of said respective RFID tags comprises at least one of:
(1) an external loop associated with the body thereof and positioned to be ruptured whenever said respective consumable inventory items associated therewith are accessed, and said altered ID characteristic thereof is that said ID characteristic includes a flagged tamper bit as readable by an associated RFID reading system whenever said frangible RFID tag external loop is ruptured;
(2) a frangible body which is ruptured whenever said respective consumable inventory items associated therewith are accessed, and said altered ID characteristic thereof is that said ID characteristic as readable by an associated RFID reading system is eliminated whenever said RFID tag frangible body is ruptured; and
(3) a frangible body which is at least partially ruptured whenever said respective consumable inventory items associated therewith are accessed, and said altered ID characteristic thereof is that said ID characteristic has relatively reduced signal strength as readable by an associated RFID reading system whenever said RFID tag frangible body is at least partially ruptured.

117. An electronic access control system for inventory data and access control for use with an enclosure of the type receivable on a mobile EMS vehicle, and having at least an exterior portion and a securable interior portion, comprising:
a microprocessor based access control circuit;
a lock configured to be unlocked by said access control circuit as operated by authorized EMS personnel;
a plurality of respective frangible RFID tags associated with respective consumable inventory items to be received in said enclosure, with said RFID tags adapted to at least partially rupture to produce altered ID characteristics for RFID reading by an RFID reader system once their respective consumable inventory items are accessed as used during the course of the mobile EMS vehicle operations;
an RFID reading system associated with said enclosure, and adapted for determining at a selected time unruptured frangible RFID tags received within said enclosure when secured, so as to identify contents of said enclosure comprising corresponding remaining respective consumable inventory items associated therewith;
memory for storage of data associated with contents of said enclosure;
a user interface configured to provide a user access to said access control circuit through input data verified by said microprocessor, wherein said access control circuit is configured to unlock said lock based on input data verified by said microprocessor, and wherein said user interface is further configured to provide a user access to said memory for tracking contents of said enclosure; and
a removable case receivable in said enclosure and having an associated non-frangible RFID tag for tracking of whether said removable case is received within said enclosure, said removable case further adapted for receiving therein said remaining consumable inventory items and their respective frangible RFID tags.

118. An electronic access control system as in claim 117, wherein:
said user interface is configured for input of programmed codes for coded tracking of stored contents in said enclosure at selected points in time; and
said system further including a communications module for uploading of inventory data to a central server over a network.

119. An electronic access control system as in claim 118, further including a plurality of said systems respectively associated with a plurality of securable enclosures, each of which communicates with a central server over an associated network, for uploading of inventory data to such central server, and for downloading operational data to each microprocessor based access control circuit.

120. An electronic access control system as in claim 117, further including a battery-operated power supply for supplying power to said system.

121. An electronic access control system as in claim 117, wherein each of said respective frangible RFID tags includes an external loop associated with the body thereof and positioned to be ruptured whenever said respective consumable inventory items associated therewith are accessed, and said altered ID characteristic thereof is that said ID characteristic includes a flagged tamper bit as readable by said RFID reading system whenever said frangible RFID tag external loop is ruptured.

122. An electronic access control system as in claim 117, wherein each of said respective frangible RFID tags includes a frangible body which is ruptured whenever said respective consumable inventory items associated therewith are accessed, and said altered ID characteristic thereof is that said ID characteristic as readable by said RFID reading system is eliminated whenever said RFID tag frangible body is ruptured.

123. An electronic access control system as in claim 117, wherein each of said respective frangible RFID tags includes a frangible body which is at least partially ruptured whenever said respective consumable inventory items associated therewith are accessed, and said altered ID characteristic thereof is that said ID characteristic has a relatively reduced signal strength as readable by said RFID reading system whenever said RFID tag frangible body is at least partially ruptured.

124. An electronic access control system for inventory data and access control for use with a plurality of securable enclosures respectively receivable on a respective plurality of mobile EMS vehicles, and a central control server, comprising:
   a plurality of microprocessor based access control circuits;
   a plurality of locks, configured to be respectively and controllably unlocked by said plurality of access control circuits as operated by authorized EMS personnel;
   a plurality of respective frangible RFID tags associated with respective consumable inventory items to be received in said respective enclosures, with said RFID tags adapted to at least partially rupture to produce altered ID characteristics for RFID reading by an RFID reader system once their respective consumable inventory items are accessed as used during the course of the mobile EMS vehicle operations;
   a plurality of respective RFID reading systems, associated with each said respective enclosure, and adapted for determining at a selected time unruptured frangible RFID tags received within said enclosure when secured, so as to identify contents of said enclosure comprising remaining corresponding respective consumable inventory items associated therewith;
   a plurality of communication means, respectively associated with each of said access control circuits, for communication via an associated communications network between an associated central control server and each of said access control circuits, whereby access to an associated plurality of securable enclosures may be centrally controlled via electronically based communications from an associated central server; and
   a plurality of removable cases respectively receivable in said enclosures and having an associated non-frangible RFID tag for tracking of whether a respective removable case is received within an enclosure, said removable cases further adapted for respectively receiving therein said consumable inventory items and their respective frangible RFID tags.

125. An electronic access control system as in claim 124, further including:
   memory for storage of data associated with contents of an associated enclosure; and
   user interface means configured to provide a user access to said access control circuit through input data verified by said microprocessor, wherein said access control circuit is configured to unlock said lock based on input data verified by said microprocessor, and wherein said user interface is further configured to provide a user access to said memory for tracking contents of an associated enclosure, whereby inventory management is provided relative to such associated enclosure.

126. An electronic access control system as in claim 124, wherein each of said respective frangible RFID tags includes a respective frangible component thereof.

127. An electronic access control system as in claim 126, wherein each of said respective frangible components of said respective RFID tags comprises at least one of:
   (1) an external loop associated with the body thereof and positioned to be ruptured whenever said respective consumable inventory items associated therewith are accessed, and said altered ID characteristic thereof is that said ID characteristic includes a flagged tamper bit as readable by an associated RFID reading system whenever said frangible RFID tag external loop is ruptured;
   (2) a frangible body which is ruptured whenever said respective consumable inventory items associated therewith are accessed, and said altered ID characteristic thereof is that said ID characteristic as readable by an associated RFID reading system is eliminated whenever said RFID tag frangible body is ruptured; and
   (3) a frangible body which is at least partially ruptured whenever said respective consumable inventory items associated therewith are accessed, and said altered ID characteristic thereof is that said ID characteristic has relatively reduced signal strength as readable by an associated RFID reading system whenever said RFID tag frangible body is at least partially ruptured.

128. Methodology for secured inventory management for inventory data and access control for a mobile EMS vehicle through use of an electronic access control system and a securable enclosure of the type having at least an exterior portion and a securable interior portion, comprising:
   associating with a securable enclosure a lock configured to be unlocked by an access control circuit;
   associating said enclosure with a mobile EMS vehicle;
   providing a removable case receivable in said enclosure and having an associated non-frangible RFID tag for tracking of whether said removable case is received within said enclosure;
   providing a plurality of respective frangible RFID tags associated with respective consumable inventory items to be received in said enclosure, with said RFID tags adapted to at least partially rupture to produce altered ID characteristics for RFID reading by an RFID reader system once their respective consumable inventory items are accessed as used during the course of the mobile EMS vehicle operations;
   removably providing said removable case with said consumable inventory items and their respective frangible RFID tags received in said case;
   associating an RFID reading system with said enclosure;
   using said RFID reading system at a selected time for determining unruptured frangible RFID tags received within said enclosure when secured, so as to identify contents of said enclosure comprising remaining corresponding respective consumable inventory items associated therewith;
   providing memory for storage of data associated with contents of the associated securable enclosure as determined at selected times with said RFID reading system; and receiving and validating credentials from a user, in order to provide access by the user to contents of the associated securable enclosure by configuring the access control circuit to unlock the lock based on validated EMS personnel credentials from such user.

129. Methodology as in claim 128, further including updating said memory with contents of the associated securable enclosure as determined with said RFID reading system, each time said enclosure is relocked.

130. Methodology as in claim 128, further including receiving and validating credentials from a user, in order to provide access by the user to contents data of the associated securable enclosure as stored in said memory.

131. Methodology as in claim 128, further including receiving an upload command, and thereafter forwarding updated data from said memory to a central location.

132. Methodology as in claim 128, further including providing removably connecting a power source with said electronic access control system, for powering said system.

133. Methodology as in claim 128, wherein each of said respective frangible RFID tags includes a respective frangible component thereof.

134. Methodology as in claim 133, wherein each of said respective frangible components of said respective RFID tags comprises at least one of:
  (1) an external loop associated with the body thereof and positioned to be ruptured whenever said respective consumable inventory items associated therewith are accessed, and said altered ID characteristic thereof is that said ID characteristic includes a flagged tamper bit as readable by said RFID reading system whenever said frangible RFID tag external loop is ruptured;
  (2) a frangible body which is ruptured whenever said respective consumable inventory items associated therewith are accessed, and said altered ID characteristic thereof is that said ID characteristic as readable by said RFID reading system is eliminated whenever said RFID tag frangible body is ruptured; and
  (3) a frangible body which is at least partially ruptured whenever said respective consumable inventory items associated therewith are accessed, and said altered ID characteristic thereof is that said ID characteristic has relatively reduced signal strength as readable by said RFID reading system whenever said RFID tag frangible body is at least partially ruptured.

* * * * *